(12) United States Patent
Tsuzuki et al.

(10) Patent No.: US 7,355,778 B2
(45) Date of Patent: Apr. 8, 2008

(54) SEMICONDUCTOR OPTICAL MODULATOR

(75) Inventors: Ken Tsuzuki, Zama (JP); Tsuyoshi Ito, Zama (JP); Ryuzo Iga, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 34 days.

(21) Appl. No.: 10/523,665

(22) PCT Filed: Mar. 11, 2004

(86) PCT No.: PCT/JP2004/003181

§ 371 (c)(1),
(2), (4) Date: Feb. 4, 2005

(87) PCT Pub. No.: WO2004/081638

PCT Pub. Date: Sep. 23, 2004

(65) Prior Publication Data

US 2006/0159381 A1    Jul. 20, 2006

(30) Foreign Application Priority Data

Mar. 11, 2003 (JP) ............... 2003-064900
Sep. 16, 2003 (JP) ............... 2003-322921

(51) Int. Cl.
*G02F 1/03* (2006.01)
(52) U.S. Cl. ............... 359/248; 359/245; 385/2
(58) Field of Classification Search ............... 359/248, 359/245, 240, 238, 250, 254; 385/2, 3, 4, 385/8
See application file for complete search history.

(56) References Cited

U.S. PATENT DOCUMENTS

| 4,282,887 | A |   | 8/1981 | Sterzer |
|---|---|---|---|---|
| 4,811,353 | A | * | 3/1989 | Noda et al. ............... 372/45.01 |
| 5,647,029 | A |   | 7/1997 | Mihailidi et al. |
| 6,075,254 | A | * | 6/2000 | Shen et al. ............... 257/21 |
| 6,122,414 | A | * | 9/2000 | Shimizu ............... 385/2 |
| 7,118,861 | B1 | * | 10/2006 | Naaman et al. ............... 435/6 |
| 2007/0076999 | A1 | * | 4/2007 | Miyazaki et al. ............... 385/8 |

FOREIGN PATENT DOCUMENTS

| JP | 05-027279 | 2/1993 |
|---|---|---|
| JP | 11-030720 | 2/1999 |
| JP | 11-072759 | 3/1999 |

OTHER PUBLICATIONS

T.Y. Chang et al., *Novel Modulator Structure Permitting Synchronous Band Filling of Multiple Quantum Wells and Extremely Large Phase Shifts*, Electron Device Meeting 1989, Technical Digest, International, Dec. 3-6, 1989, pp. 737-740.

(Continued)

*Primary Examiner*—Timothy Thompson
(74) *Attorney, Agent, or Firm*—Workman Nydegger

(57) ABSTRACT

A semiconductor optical converter for use principally in an optical communications system or an optical information processing system.

The semiconductor optical converter comprises an n-InP clad layer (12), an optical waveguide layer (13), an SI-InP clad layer (14), and an n-InP clad layer (15) formed sequentially on an SI-InP substrate (11), characterized in that a voltage is applied from an electrode (16) connected with the n-InP clad layer (15) and a ground electrode (17) connected with the n-InP clad layer (12).

The semiconductor optical converter is especially applicable as a semiconductor phase modulator or a semiconductor Mach-Zehnder phase modulator operating at low voltages and having a low waveguide loss.

14 Claims, 17 Drawing Sheets

OTHER PUBLICATIONS

C. Rolland et al., *10 Gbit/s, 1.56μm Multiquantum Well InP/InGaAsP Mach-Zehnder Optical Modulator*, Electronics Letters, Mar. 4, 1993, vol. 29, No. 5, pp. 471-472.

R. Spickermann et al., *GaAs/AlGaAs Electro-Optic Modulator with Bandwidth > 40 GHz*, Electronics Letters, May 25, 1995, vol. 31, No. 11, pp. 915-916.

Jin-Wei Shi et al., *Design and Analysis of Long Absorption-Length Traveling-Wave Photodetectors*, Journal of Lightwave Technology, Dec. 2000, vol. 18, 12$^{th}$ issue, pp. 2176-2187.

S. Zumkley et al., *Vertical n-i-n Multiple-Quantum-Well Electrooptical Modulators for High-Speed Applications*, IEEE Photonics Technology Letters, IEEE Service Center, Piscataway, NJ, vol. 5, No. 2, Feb. 1, 1993, pp. 178-180.

Ewa M. Goldys et al., *Operation and Theoretical Analysis of the Multiple Asymmetric Coupled Quantum-Well Light Modulator in the n-i-n Configuration*, IEEE Journal of Quantum Electronics, IEEE Service Center, Piscataway, NJ, vol. 33, No. 7, Jul. 1997, pp. 1084-1088.

Won-Sun Cho et al., *Analysis of Traveling-wave Coplanar Waveguide MQW Electro-absorption Modulator Using the 3D Finite-Difference Time-Domain Method*, Proc SPIE Int Soc Opt Eng; Proceedings of SPIE - the International Society for Optical Engineering 1999 Society of Photo-Optical Instrumentation Engineers, Bellingham, WA, vol. 3625, 1999, pp. 198-206.

K. Tsuzuki et al., *40 Gbit/s n-i-n InP Mach-Zehnder Modulator with a π Voltage of 2.2 V*, Electronics Letters, vol. 39, No. 20, Oct. 22, 2003, pp. 1464-1466.

* cited by examiner

SEMICONDUCTOR OPTICAL MODULATOR

TECHNICAL FIELD

This invention relates to a semiconductor optical modulator, and in particular to a semiconductor optical modulator that can be used as a semiconductor phase modulator or a semiconductor Mach-Zehnder type optical modulator.

BACKGROUND ART

A waveguide type light control device, such as an optical modulator, is a key element in a high-speed optical communications system and an optical information processing system. The optical modulator includes, for example, an optical modulator that uses dielectric materials, such as $LiNbO_3$ (LN), and an optical modulator that uses semiconductor materials, such as InP and GaAs. Among these optical modulators, expectations have been placed on a semiconductor optical modulator that can be integrated with other optical elements and other electronic circuits, such as lasers and optical amplifiers, and that can easily achieve a reduction in size and a reduction in voltage.

An electroabsorption optical modulator and a Mach-Zehnder type optical modulator are each known as a typical semiconductor optical modulator.

The electroabsorption optical modulator is an optical modulator that uses the effect of allowing an absorption edge to shift toward a long wavelength by applying an electric field, such as a Franz-Keldysh Effect in a bulk semiconductor or a Quantum Confined Stark Effect (QCSE) in a multi-quantum well structure.

The Mach-Zehnder type optical modulator is an optical modulator that uses the effect of causing a change in the refractive index by applying an electric field, such as an electro-optic effect (Pockels Effect) in a bulk semiconductor or a Quantum Confined Stark Effect in a multi-quantum well structure.

The electroabsorption optical modulator is considered as a promising optical modulator because of being small in power consumption, being small in size, and being unlike an LN modulator that causes a drift by DC voltage. However, the electroabsorption optical modulator is characterized in that the waveform of an optical signal that has been transmitted through an optical fiber is deteriorated owing to wavelength chirping caused when modulated.

In more detail, owing to wavelength chirping, the spectrum of an optical signal that has been modulated becomes wider than that of the optical signal that has not yet been modulated. When the optical signal that has been modulated is transmitted through an optical fiber, the waveform of the optical signal undergoes waveform deterioration by the effect of dispersion of the fiber medium. As a result, transmission characteristics are deteriorated. The waveform deterioration becomes more noticeable in proportion to a rise in transmission speed and an increase in transmission distance.

On the other hand, the Mach-Zehnder type optical modulator can remove wavelength chirping in principle and is therefore expected to be a modulator used for ultra high-speed and long-distance communications.

For example, a semiconductor Mach-Zehnder type optical modulator is described in C. Rolland et al., 10 Gbit/s, 1.56 µm multiquantum well InP/InGaAsP Mach-Zehnder optical modulator, Electron Lett., Volume 29, 5th issue, pp. 471-472, 1993 (hereinafter, referred to as Document 1). This modulator is a lumped-constant type modulator that has a pin structure. In the lumped-constant type modulator having a pin structure, light is guided through a non-doped Multi-Quantum Well (MQW) region that is placed between a p-type semiconductor layer and an n-type semiconductor layer and that has a layer thickness of 0.4 µm. Accordingly, the light undergoes refractive-index modulation by an electric field with high efficiency. Therefore, the length of a phase-modulating portion can be extremely shortened. For example, the length of a phase-modulating portion of an LN modulator is 20 to 30 mm, whereas that of the lumped-constant type modulator can be set at 600 µm.

However, the lumped-constant type modulator has a great optical loss in the p-type semiconductor part. For example, the total insertion loss is 13 dB. Additionally, the lumped-constant type modulator has difficulty in performing an operation at 10 Gbit/s or more because of speed restrictions by the CR time constant.

FIG. 13 is a schematic sectional view of a waveguide of a Mach-Zehnder type optical modulator having a traveling-wave-type electrode structure, and shows a cross-sectional structure of an electric-field-applied portion. The Mach-Zehnder type optical modulator having the structure of FIG. 13 is a traveling-wave-electrode-type modulator that uses a Schottky electrode. This modulator is currently being researched thoroughly in order to solve the problem of the lumped-constant type modulator mentioned above, and is described, for example, in R. Spickermann et al., GaAs/AlGaAs electro-optic modulator with bandwidth>40 GHz, Electron Lett., Volume 31, 11th issue, pp. 915-916, 1995 (hereinafter, referred to as Document 2).

As shown in FIG. 13, the electric-field-applied portion is made up of an SI (Semi-Insulate)-InP cladding layer 71, an optical waveguide core layer 72 laminated on the SI-InP cladding layer 71, a ridge-shaped SI-InP cladding layer 73, a ground electrode 74, and a Schottky electrode 75 on the surface of the ridge. The SI-InP cladding layers 71 and 73 can be replaced by i (non-doped)-InP, and can be formed not only with InP but also with GaAs-based materials.

The conventional lumped constant type modulator having the pin structure has proved difficult in realizing a traveling-wave-type electrode structure because of the waveguide loss of an electric signal in the p-type electrode and because of mismatching in velocity between light and an electric field caused by the capacity component of the pin structure.

The Mach-Zehnder type optical modulator having the structure shown in FIG. 13 has realized a traveling-wave-type electrode structure by using a Schottky electrode. Additionally, this traveling-wave-electrode-type modulator can remove the defect described with reference to the lumped-constant type modulator by using an SI layer or a non-doped layer as a semiconductor.

However, in the Mach-Zehnder type optical modulator having the structure of FIG. 13, the distance GAP between the Schottky electrode 75 and the ground electrode 74 becomes equal to about 9 µm at a minimum, which can be regarded as a relatively great value, resulting from processing restraints. Therefore, the electric field strength (which is shown by arrows in FIG. 13) of the optical waveguide core layer 72 becomes small. As a result, the modulation efficiency of the refractive index of the optical modulator is lowered.

The modulation efficiency is small in the Mach-Zehnder type optical modulator having the structure of FIG. 13, and therefore, in order to perform a sufficient phase modulation, the phase-modulating portion is required to be lengthened, or a high operating voltage is needed. As a result, it is known that the traveling-wave-electrode-type modulator cannot be made as compact as the lumped constant type modulator (for example, about 10 mm) or has a high operating voltage (for example, Vπ=28V).

A modulator disclosed in U.S. Pat. No. 5,647,029 (hereinafter, referred to as Document 5) is known as another prior art example of the semiconductor optical modulator of the traveling-wave-type electrode structure. FIG. 14 is a cross-sectional view of a waveguide of a semiconductor optical modulator shown in Document 5. As shown in FIG. 14, the optical modulator 80 is a high-mesa waveguide type modulator in which an n-type InAlAs lower cladding layer 82, an optical waveguide core layer 83 including a quantum well, and an n-type InAlAs upper cladding layer 84 are laminated on an SI-InP substrate 81 in this order.

The semiconductor optical modulator shown in FIG. 14 is characterized in that the upper and lower surfaces of the optical waveguide core layer 83 are sandwiched between the n-type InAlAs cladding layers 82 and 84, and voltage is applied between the cladding layers 82 and 84 through electrodes 85 and 86.

The semiconductor optical modulator shown in FIG. 14 is additionally characterized in that high-speed optical modulation in which a driving frequency band reaches 40 GHz is realized by changing the distance "s" between the electrode 85 and the optical waveguide core layer 83 of the semiconductor optical waveguide or the thickness "t" of the cladding layer 82 between the optical waveguide core layer 83 and the SI-InP substrate 81 and by satisfying an impedance-matching condition and a velocity-matching condition between signal light and an electric signal.

However, since the structure of the semiconductor optical modulator shown in FIG. 14 does not have a potential barrier, plenty of electric current flows when voltage is applied. Therefore, this element is formed on the premise that a BRAQWET layer (Barrier-Reservoir And Quantum-Well Electron-Transfer layer) is used as the optical waveguide core layer 83. The BRAQWET layer is described in detail, for example, in T. Y. Chang et al., Novel modulator structure permitting synchronous band filling of multiple quantum wells and extremely large phase shifts, Electron Device Meeting 1989, Technical Digest, International, 3-6 Dec. 1989, pp. 737-740 (hereinafter, referred to as Document 3).

The BRAQWET layer has a structure in which an n-type semiconductor layer, an MQW optical waveguide core layer, a p-type semiconductor layer, and an n-type semiconductor layer are sequentially laminated. FIG. 15A and FIG. 15B each show a banded structure of the BRAQWET layer. FIG. 15A shows a state in which voltage is not applied, and FIG. 15B shows a state in which voltage is applied. As shown in FIG. 15A, the banded structure of the BRAQWET layer is a structure using a p-type semiconductor part as a potential barrier with respect to electrons by use of a difference in the Fermi level between the n-type semiconductor part and the p-type semiconductor part. As shown in FIG. 15B, since there is a barrier by which electrons are blocked from flowing through two electrodes when voltage is applied, a structure that permits voltage application to the optical waveguide is formed.

This structure is characterized by using the band filling effect caused by injecting electrons into the MQW optical waveguide core layer, that is, using a change in absorption coefficient or a change in refractive index. Only the electrons are injected into the MQW optical waveguide core layer, and holes do not contribute to a response produced when voltage is applied. The BRAQWET layer can respond to a high-speed electric signal since it does not operate through a hole that is small in mobility.

In practice, a lift of a band gap in the p-type semiconductor part effectively blocks an electric current, and therefore the n-type semiconductor and the p-type semiconductor are required to undergo an extremely precise concentration control operation. However, it is difficult to steeply control an n-type carrier concentration and a p-type carrier concentration at a layer interface. Additionally, if anon-doped area becomes large, an electric field is applied to this non-doped area, and the efficiency of the electro-optic effect will be lowered.

Therefore, it is very difficult to produce a practical optical modulator that employs the BRAQWET structure. In the optical modulator of each document mentioned above, the band gap is great, and the barrier is heightened by using the p-type semiconductor as a barrier layer. An optical modulator that has the thus formed structure and that has optical extinction characteristics sufficient to be usable in practice has so far been unknown.

A traveling-wave-type electrode photodiode that has across-sectional structure shown in FIG. 16 can be mentioned as an example in which the upper and lower parts of an optical waveguide core layer are sandwiched between n-type cladding layers, which is not an example of the optical modulator [Jin-Wei Shi and Chi-Kuang Sun, Design and Analysis of Long Absorption-Length Traveling-Wave Photodetectors, Journal of Lightwave Technology, December, 2000, Volume 18, 12th issue, pp. 2176-2187 (hereinafter, referred to as Document 4)]. A traveling-wave-type electrode photodiode 90 shown in FIG. 16 has a layered structure in which an n-type cladding layer 92, an optical waveguide core layer 93, an n-type cladding layer 94 are laminated on an SI-GaAs substrate 91. The optical waveguide core layer 93 sandwiched between the n-type cladding layer 92 and the n-type cladding layer 94 uses high-resistance GaAs (LTG-GaAs) in order to control an electric current generated when voltage is applied. The traveling-wave-type electrode photodiode 90 comprises an electrode 96 placed on the n-type AlGaAs cladding layer 94 and an electrode 95 placed on the n-type AlGaAs cladding layer 92.

However, since low-temperature growth GaAs (LTG-GaAs) is used as high-resistance GaAs, optical losses are generated by a fault caused by the low-temperature growth.

As described above, among the semiconductor Mach-Zehnder type optical modulators being presently researched, the lumped-constant type modulator proves difficult in operating at 10 Gbit/s or more because the optical loss is great in the p-type semiconductor part, and speed restrictions by the CR time constant are imposed. The traveling-wave-electrode-type modulator has a problem in the fact that the modulation efficiency of the refractive index is small, and the phase-modulating portion cannot be easily reduced in size, so that an operating voltage becomes high.

DISCLOSURE OF THE INVENTION

The present invention has been made in consideration of the foregoing circumstances, and it is an object of the present invention to provide a semiconductor optical modulator, such as a semiconductor Mach-Zehnder type optical modulator or a semiconductor phase modulator, that has concurrently realized a voltage reduction, a size reduction, and a faster operation.

In order to achieve the object, a semiconductor optical modulator according to a first aspect of the present invention is characterized in that the semiconductor optical modulator has a layered structure in which a semi-insulating type cladding layer, a semiconductor optical waveguide core layer, and a semi-insulating type cladding layer are sequentially laminated on a substrate, wherein a part or all of at least one of the semi-insulating type cladding layers including a surface that faces a laminated surface of the semiconductor optical waveguide core layer is an n-type cladding layer.

Two cases can be mentioned as examples. That is, one thereof is a case concerning one of the semi-insulating type cladding layers between which the semiconductor optical waveguide core layer is sandwiched, in which a part or all of the semi-insulating type cladding layer that includes a surface opposite from a laminated surface with the semiconductor optical waveguide core layer is an n-type cladding layer, or in which all of the semi-insulating type cladding layer is an n-type cladding layer, and the other one is a case concerning both of the semi-insulating type cladding layers between which the semiconductor optical waveguide core layer is sandwiched, in which a part of the semi-insulating type cladding layer that includes a surface opposite from a laminated surface with the semiconductor optical waveguide core layer is an n-type cladding layer, or all of the semi-insulating type cladding layer is an n-type cladding layer. (It is to be noted that the whole of both of the semi-insulating type cladding layers never serves as an n-type cladding layer.)

In more detail, as a first example, there exists a case in which an n-type cladding layer (hereinafter, referred to as "n layer"), a semi-insulating type cladding layer (hereinafter, referred to as "SI layer"), a semiconductor optical waveguide core layer (hereinafter, referred to as "optical waveguide core layer"), an SI layer, and an n layer are sequentially laminated on a substrate. As a second example, there exists a case in which an n layer, an SI layer, an optical waveguide core layer, and an SI layer are sequentially laminated on a substrate. As a third example, there exists a case in which an SI layer, an optical waveguide core layer, an SI layer, and an n layer are sequentially laminated on a substrate. As a fourth example, there exists a case in which an SI layer, an optical waveguide core layer, and an n layer are sequentially laminated on a substrate. As a fifth example, there exists a case in which an n layer, an optical waveguide core layer, and an SI layer are sequentially laminated on a substrate. As a sixth example, there exists a case in which an n layer, an optical waveguide core layer, an SI layer, and an n layer are sequentially laminated on a substrate. As a seventh example, there exists a case in which an n layer, an SI layer, an optical waveguide core layer, and an n layer are sequentially laminated on a substrate.

In order to achieve the object, a semiconductor optical modulator according to a second aspect of the present invention is characterized in that the semiconductor optical modulator has a layered structure in which an n-type cladding layer, an optical waveguide core layer, and an n-type cladding layer are sequentially laminated on a substrate, wherein a semi-insulating type cladding layer is placed between at least one of the n-type cladding layers and the optical waveguide core layer.

That is, there are cases of the first example, the sixth example, and the seventh example in the first aspect of the present invention.

The semiconductor optical modulator of the present invention differs from the optical modulator disclosed in Document 1 mentioned above, because a semi-insulating type cladding layer is inserted between an n-type cladding layer and a semiconductor optical waveguide core layer. Additionally, the semiconductor optical modulator of the present invention differs from the traveling-wave-electrode-type photodiode disclosed in Document 4 mentioned above. In more detail, the semiconductor optical modulator of the present invention uses a non-high-resistance semiconductor optical waveguide core layer (for example, non-doped optical waveguide core layer), and a semi-insulating type cladding layer is inserted between the non-high-resistance semiconductor optical waveguide core layer and an n-type cladding layer.

In other words, in the semiconductor optical modulator of the present invention, a semi-insulating type cladding layer is disposed on at least one of the upper and lower surfaces of a semiconductor optical waveguide core layer, and an n-type doped layer is disposed on at least either of the upper surface of the semi-insulating type cladding layer disposed on the upper surface of the semiconductor optical waveguide core layer and the undersurface of the semi-insulating type cladding layer disposed on the undersurface of the semiconductor optical waveguide core layer. Therefore, since a p-type doped layer is not used, there is neither an optical absorption loss of the p-type semiconductor nor a conductor loss of the p-type electrode, and it is possible to realize a low-loss optical waveguide and a traveling-wave-type electrode structure.

Additionally, since a semi-insulating type cladding layer is disposed on at least one of the upper and lower surfaces of a semiconductor optical waveguide core layer, voltage can be applied without the flow of an electric current even if an n electrode is disposed on both of the upper and lower sides of the semiconductor optical waveguide core layer.

The semiconductor optical modulator of the present invention can be set a distance between electrode layers at 5 μm or less. In other words, the semiconductor optical modulator of the present invention allows for an electric field strength greater than a conventional semiconductor optical modulator having a traveling-wave-type electrode structure. Therefore, in the semiconductor optical modulator of the present invention, the modulation efficiency of the refractive index can be heightened, and a phase-modulating portion can be reduced in size, so that an operating voltage can be lowered. Additionally, the semiconductor optical modulator of the present invention employs a traveling-wave-type electrode structure, and therefore can operate in a high frequency band of 10 Gbit/s or more, unlike a lumped constant electrode that is restricted by the CR time constant.

The semiconductor optical modulator of the present invention can use a non-doped semiconductor layer as a semiconductor optical waveguide core layer. That is, the need for creating a high-resistance state can be removed by being intentionally doped with semi-insulating impurities such as Fe or by low-temperature growth. In a case in which a non-doped semiconductor layer is used as a semiconductor optical waveguide core layer, the optical loss in the optical waveguide core layer becomes small. In the semiconductor optical modulator of the present invention, a great electric field can be applied onto the semiconductor optical waveguide core layer by the potential barrier of the semi-insulating type cladding layer especially in a case in which the semi-insulating type cladding layer is disposed on only one of the upper and lower surfaces of the semiconductor optical waveguide core layer.

In order to achieve the aforementioned object, a semiconductor optical modulator according to a third aspect of the present invention is characterized in that, in the semiconductor optical modulator according to the first or second aspect of the present invention, the waveguide structure is a high-mesa waveguide structure or a ridge waveguide structure.

The high-mesa waveguide structure is a structure of an optical waveguide formed by etching to a lower layer of the semiconductor optical waveguide core layer (that is, toward the substrate). The ridge waveguide structure is a structure of an optical waveguide formed by etching to an upper layer of the semiconductor optical waveguide core layer (that is, in a direction receding from the substrate).

In order to achieve the aforementioned object, a semiconductor optical modulator according to a fourth aspect of the present invention is characterized in that, in the semiconductor optical modulator according to the first or second aspect of the present invention, electrodes are respectively connected to the n-type cladding layer or the semi-insulating type cladding layer placed directly on the substrate and to the n-type cladding layer or the semi-insulating type cladding layer including a surface that is opposite from a laminated surface with the semiconductor optical waveguide core layer laminated on the substrate, and voltage is applied.

In the first, sixth, and seventh examples described with reference to the first aspect of the present invention, the n-type cladding layers exist as a layer placed directly on the substrate and as an uppermost layer of the layers laminated on the substrate, respectively, and therefore both electrodes are connected to these n-type cladding layers, respectively. Additionally, in the second to fifth examples, one of the layers is an n-type cladding layer, and the other one is a semi-insulating type cladding layer, and therefore one of the electrodes is connected to the n-type cladding layer, and the other electrode is connected to the semi-insulating type cladding layer.

The n-type cladding layer is electrically conductive and is capable of fulfilling the same function as an electrode. Therefore, a substantial electrode-to-electrode distance that allows the semiconductor optical waveguide core layer to generate an electric field can be made smaller than an actual electrode-to-electrode distance.

In order to achieve the aforementioned object, a semiconductor optical modulator according to a fifth aspect of the present invention is characterized in that, in the semiconductor optical modulator according to the fourth aspect of the present invention, the electrode has a coplanar waveguide line structure.

In order to achieve the aforementioned object, a semiconductor Mach-Zehnder type optical modulator according to a sixth aspect of the present invention is characterized by including the semiconductor optical modulator according to any one of the first to fifth aspects of the present invention, an optical splitter by which input light is split into two, and an optical coupler by which light beams modulated by the semiconductor optical modulator are combined together.

A conventional modulator having a pin structure can use a refractive-index modulation by an electric field with high efficiency. However, the conventional modulator having the pin structure is at a disadvantage, because of the photoabsorption loss of the p-type semiconductor and the conductor loss of the p-type electrode or because of the difficulty of the traveling-wave-type electrode structure by mismatching in velocity between light and an electric field.

By employing the structures according to the first to fifth aspects of the present invention, the semiconductor Mach-Zehnder type optical modulator of the present invention can realize a traveling-wave-type electrode structure that can generate a refractive-index modulation by an electric field with high efficiency.

BEST MODE FOR CARRYING OUT THE INVENTION

First Embodiment

Figure 1:
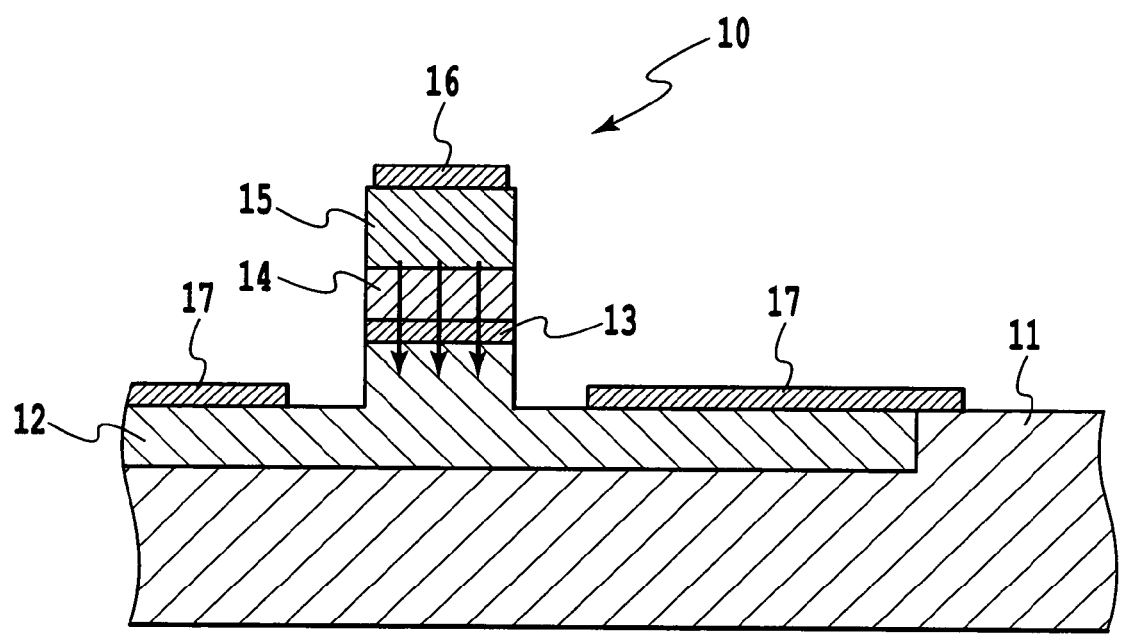
FIG. 1 is a schematic sectional view of a waveguide (high-mesa structure), to which an electric field is applied, of a semiconductor optical modulator according to a first embodiment.

FIG. 1 is a schematic sectional view of a waveguide of an InP-based multi-quantum well semiconductor optical modulator according to a first embodiment, showing a cross-sectional structure of a part, to which an electric field is applied, of the waveguide.

The semiconductor optical modulator according to this embodiment has an optical waveguide structure obtained by processing a layered structure, in which an n-InP cladding layer 12, an optical waveguide core layer 13, an SI-InP cladding layer 14, and an n-InP cladding layer 15 are sequentially laminated on an SI-InP substrate 11, so as to be shaped like a mesa according to an etching process.

The semiconductor optical modulator according to the first embodiment is a high-mesa waveguide structure 10 in which an etching operation is applied to a part under the optical waveguide core layer 13 (in this embodiment, to the n-InP cladding layer 12 that is a layer placed under the optical waveguide core layer 13).

The semiconductor optical modulator shown in FIG. 1 has an electrode 16 placed on the upper surface of the n-InP cladding layer 15 and ground electrodes 17 placed on the upper surface of the n-InP cladding layer 12. In order to apply a high frequency signal between the electrode 16 and the ground electrode 17, a coplanar waveguide line (CPW) structure formed such that the electrode 16 is placed between the two ground electrodes 17 is employed as the electrode structure.

Figure 2:
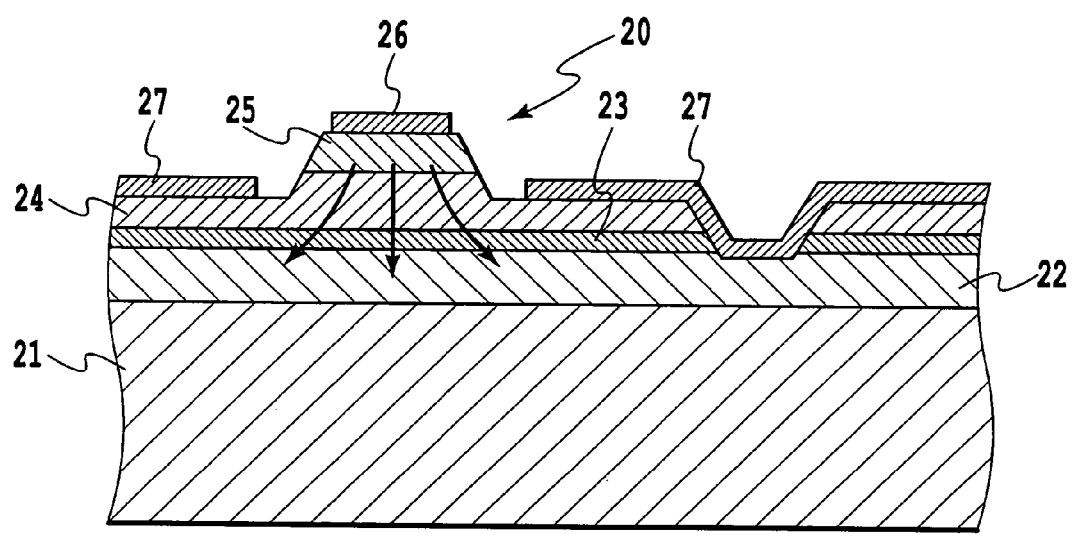
FIG. 2 is a schematic sectional view of a waveguide (ridge structure), to which an electric field is applied, of the semiconductor optical modulator according to the first embodiment.

A ridge waveguide structure in which an etching operation is applied to a part above the optical waveguide core layer can also be employed as the waveguide structure. FIG. 2 shows a sectional structure of a part, to which an electric field is applied, of the waveguide to which a ridge waveguide structure 20 is applied. In the waveguide shown in FIG. 2, an n-InP cladding layer 22, an optical waveguide core layer 23, an SI-InP cladding layer 24, and an n-InP cladding layer 25 are sequentially laminated on an SI-InP substrate 21, and an etching operation is applied to the SI-InP cladding layer 24 that is a layer placed on the optical waveguide core layer 23.

The semiconductor optical modulator shown in FIG. 2 has an electrode 26 placed on the upper surface of the n-InP cladding layer 25. The ground electrode is required to be connected to the n-InP cladding layer that is a layer placed under the optical waveguide core layer. The ridge waveguide structure shown in FIG. 2 has a groove from the surface of the SI-InP cladding layer 24 to the n-InP cladding layer 22, and the ground electrodes 27 are disposed so as to be connected to the n-InP cladding layer 22.

When the ground electrode 27 and the n-InP cladding layer 22 are connected together, there is the possibility that electrons will flow into the optical waveguide core layer 23 so that electrooptic characteristics are deteriorated when voltage is applied, because of contact between the ground electrode 27 and the optical waveguide core layer 23. However, since the optical waveguide core layer 23 is a non-doped layer, this problem can be overcome by forming a connecting portion (groove) between the ground electrode 27 and the n-InP cladding layer 22 at a location sufficiently away from the ridge waveguide part.

For example, in the semiconductor optical modulator of FIG. 1, the optical waveguide core layer 13 is allowed to generate a signal electric field (shown by arrows in FIG. 1) by applying voltage between the electrode 16 and the ground electrode 17 when activated. In the first embodiment, the n-InP cladding layer 15 and the n-InP cladding layer 12 are electrically conductive and are capable of fulfilling the same function as the electrode. An electrode-to-electrode distance that allows the optical waveguide core layer 13 to generate an electric field is substantially a distance between the n-InP cladding layer 15 and the n-InP cladding layer 12.

Figure 13:
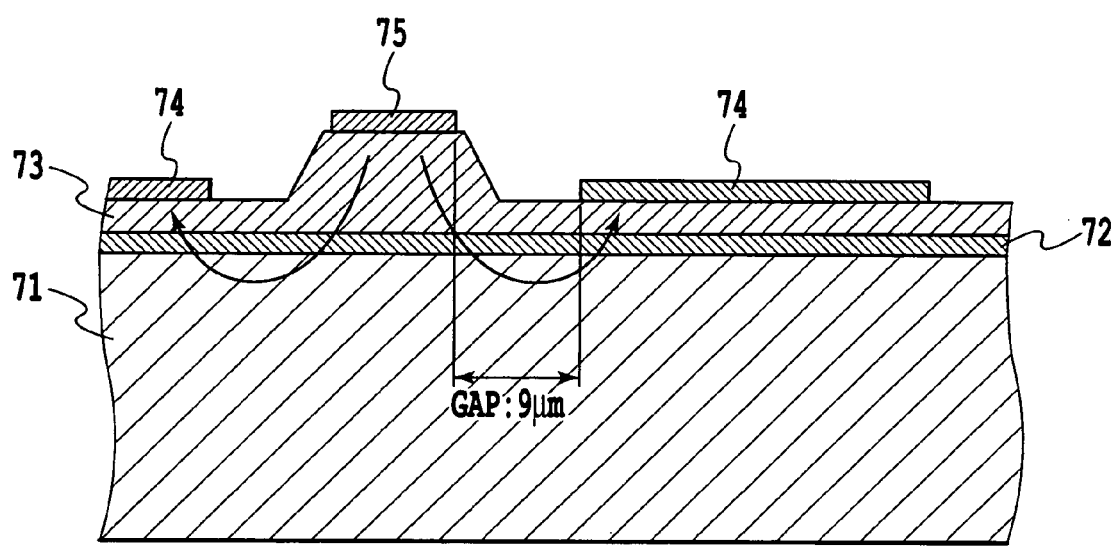
FIG. 13 is a schematic sectional view of a waveguide, to which an electric field is applied, of a conventional semiconductor optical modulator having a traveling-wave-type electrode structure.
Figure 14:
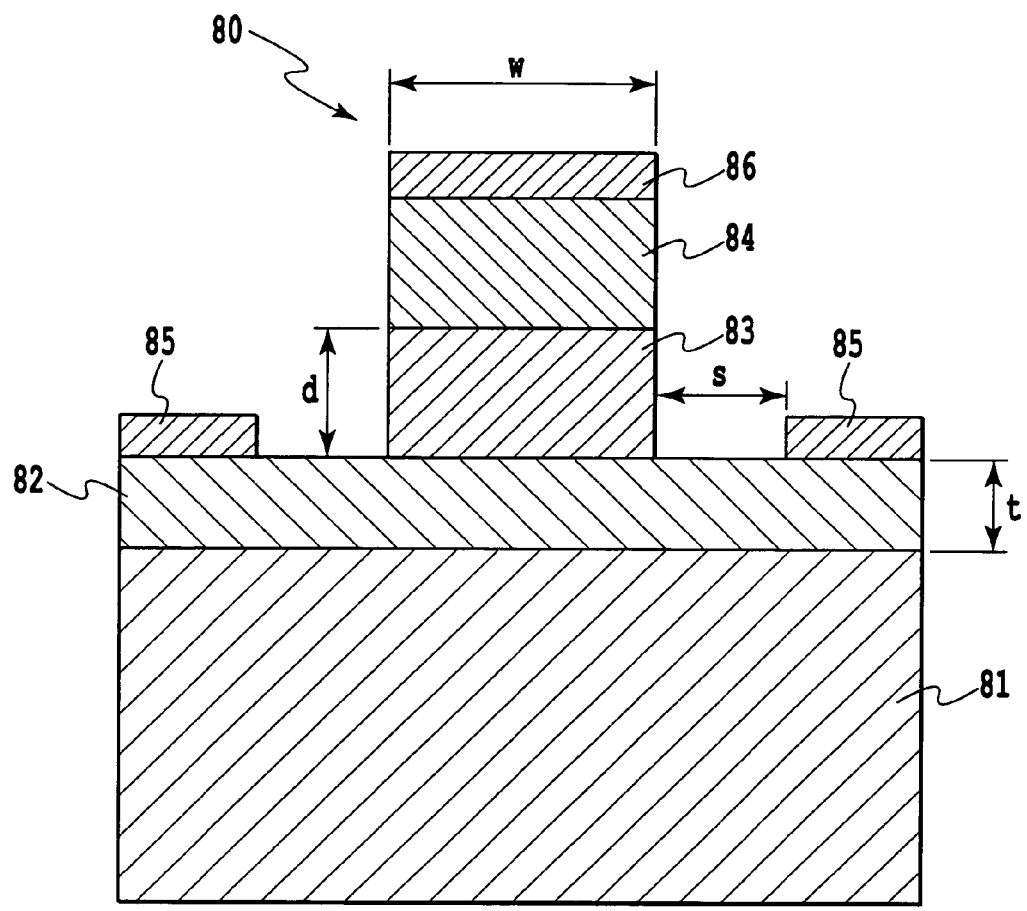
FIG. 14 is a schematic sectional view of a waveguide, to which an electric field is applied, of another example of the conventional semiconductor optical modulator having a traveling-wave-type electrode structure.
Figure 15A:
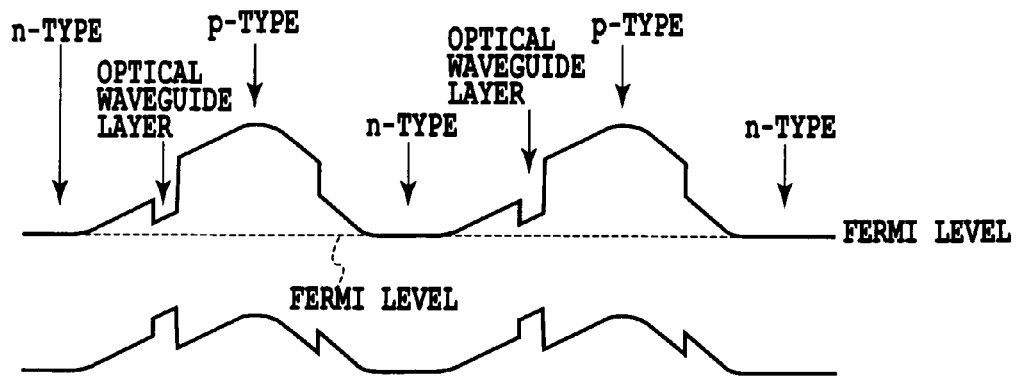
FIG. 15A shows a banded structure of a BRAQWET layer in a state in which voltage is not applied.
Figure 15B:
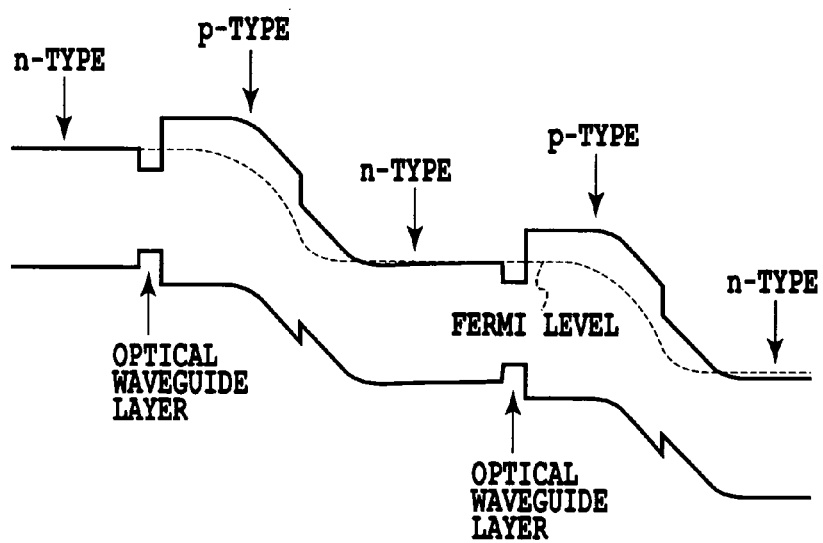
FIG. 15B shows a banded structure of the BRAQWET layer in a state in which voltage is applied.
Figure 16:
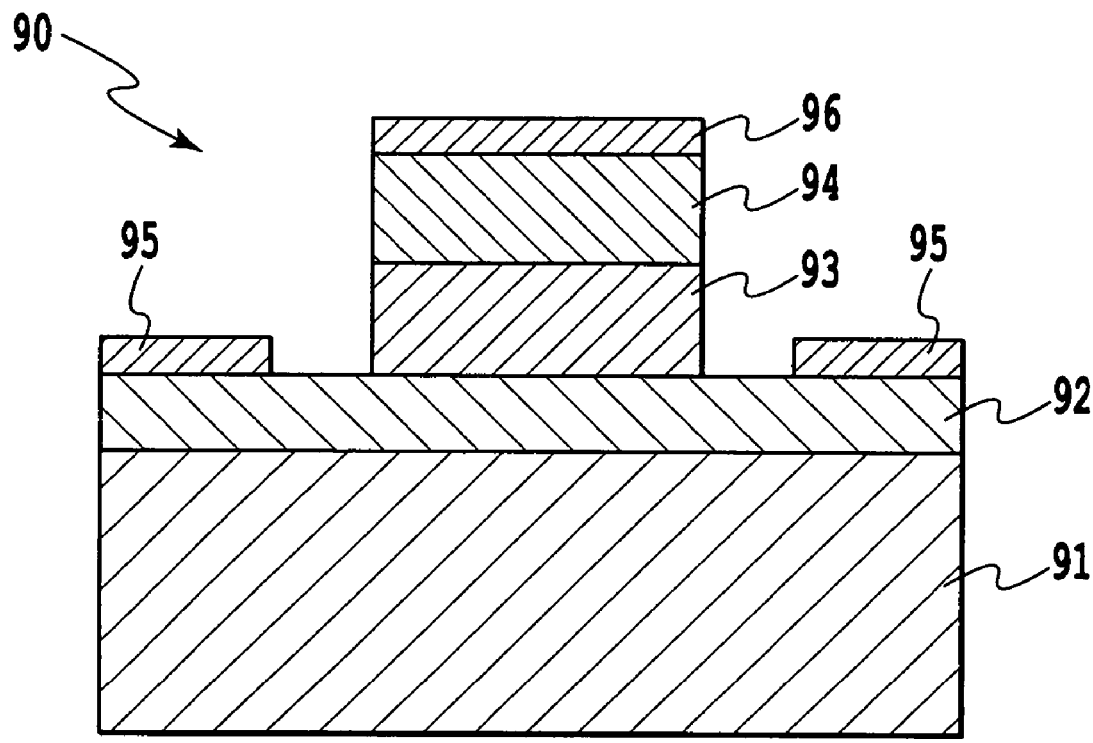
FIG. 16 is a schematic sectional view of a traveling-wave-type electrode photodiode that has a structure in which the upper and lower parts of an optical waveguide core layer are sandwiched between n-type cladding layers.

Therefore, the semiconductor optical modulator according to the first embodiment can make the substantial electrode-to-electrode distance shorter than the prior art modulator (see FIG. 13), and can increase electric field strength in the optical waveguide core layer 13, and can enhance an electrooptic effect.

Next, a description will be given of the thickness of the optical waveguide core layer 13 and the thickness of the SI-InP cladding layer 14, especially of the thickness of the SI-InP cladding layer 14 upon which the substantial electrode-to-electrode distance depends.

Figure 3:
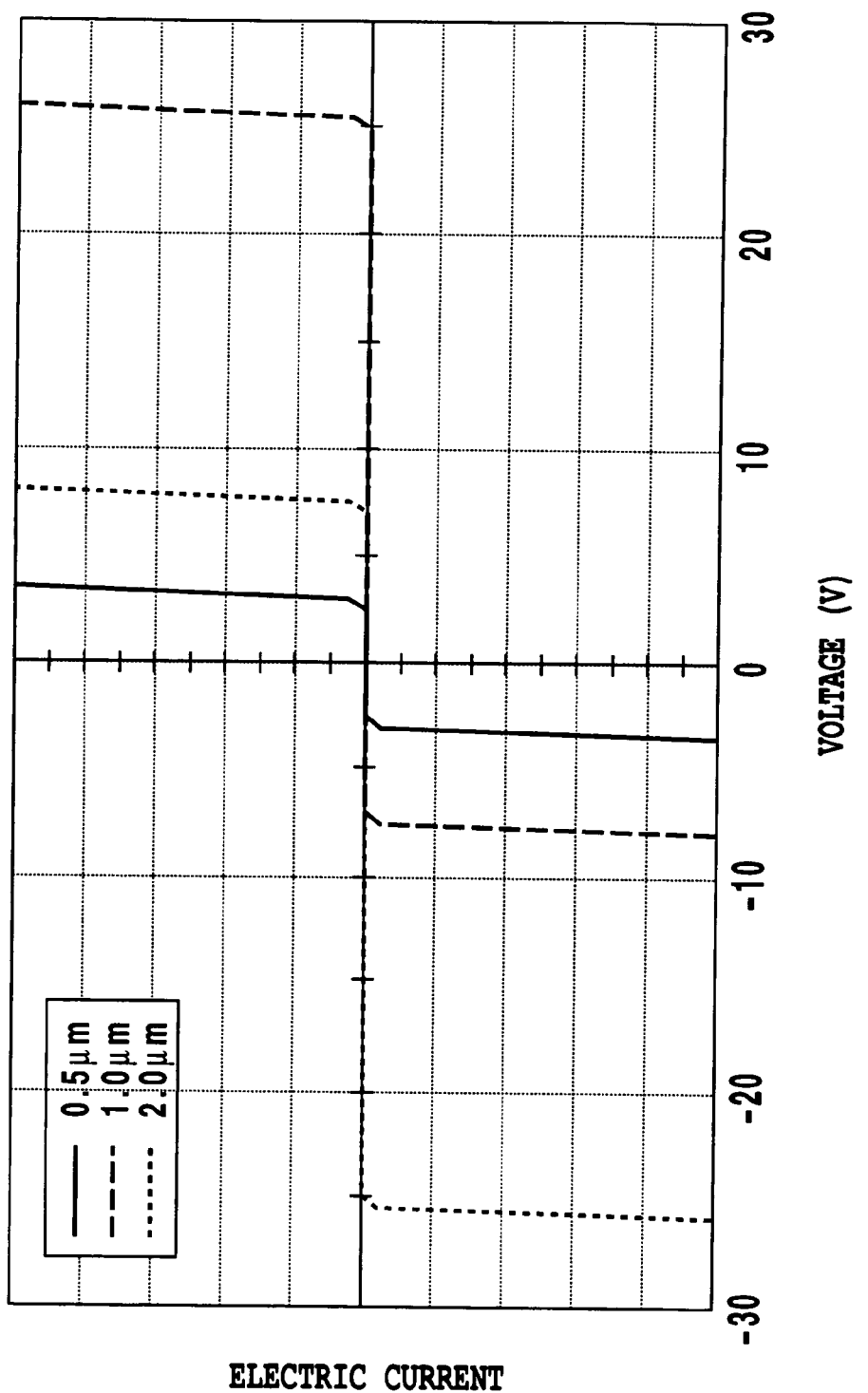
FIG. 3 shows a relationship between the thickness of a SI semiconductor layer and the withstand voltage thereof.

The value of voltage that can be applied between the n-InP cladding layer 15 and the n-InP cladding layer 12 through the electrode 16 and through the ground electrode 17 is determined by the withstand voltage of the SI-InP cladding layer 14 placed between the two n-type semiconductor layers. FIG. 3 shows a relationship between the thickness of the SI-InP cladding layer and the withstand voltage thereof.

As shown in FIG. 3, the withstand voltage is ±2.5V when the thickness of the SI-InP cladding layer 14 is 0.5 μm, the withstand voltage is ±7.0V when the thickness thereof is 1.0 μm, and the withstand voltage is ±25V when the thickness thereof is 2.0 μm.

Herein, the semiconductor optical modulator according to the first embodiment is smaller in the substantial electrode-to-electrode distance (that is, distance between the n-InP cladding layer 15 and the n-InP cladding layer 12) than the prior art semiconductor optical modulator (see FIG. 13), and therefore a high-strength electric field can be generated by applying a relatively low voltage, and an electrooptic effect can be used with high efficiency.

In the prior art semiconductor optical modulator, the electrode-to-electrode distance is about 9 μm, which is a great value, and, accordingly, there has been a need to apply a high voltage (about 28V). In contrast, in the semiconductor optical modulator according to the first embodiment, the substantial electrode-to-electrode distance can be made small, and the efficiency of the electrooptic effect can be enhanced, so that a driving voltage can be lowered, and the size of each device can be reduced.

If the distance between the optical waveguide core layer 13 and the electrode 16 is set at about 1 μm or less in the semiconductor optical modulator according to the first embodiment, the loss of signal light will be increased by a metal forming the electrode 16. Therefore, preferably, the distance between the optical waveguide core layer 13 and the electrode 16 is set at 1 μm or more in the semiconductor optical modulator according to the first embodiment.

The distance from the optical waveguide core layer 13 to the electrode 16 is determined by the thickness of the n-InP cladding layer 15 and the thickness of the SI-InP cladding layer 14. The semiconductor optical modulator according to the first embodiment can keep the distance from the optical waveguide core layer 13 to the electrode 16 at 1 μm or more by adjusting (that is, enlarging) the thickness of the n-InP cladding layer 15 even if the thickness of the SI-InP cladding layer 14 is set to be small in order to take velocity matching and impedance matching. Therefore, it is possible to form a phase-modulating portion that can prevent the optical loss by the electrode 16 and that can use an electrooptic effect with high efficiency.

Figure 4A:
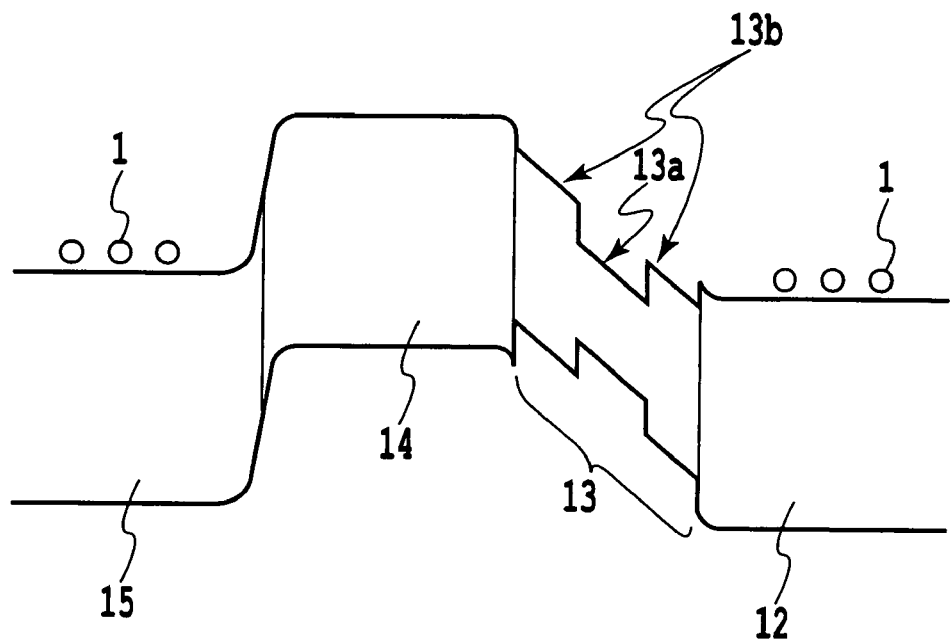
FIG. 4A is a band diagram of the semiconductor optical modulator according to the first embodiment, showing a field-free state.
Figure 4B:
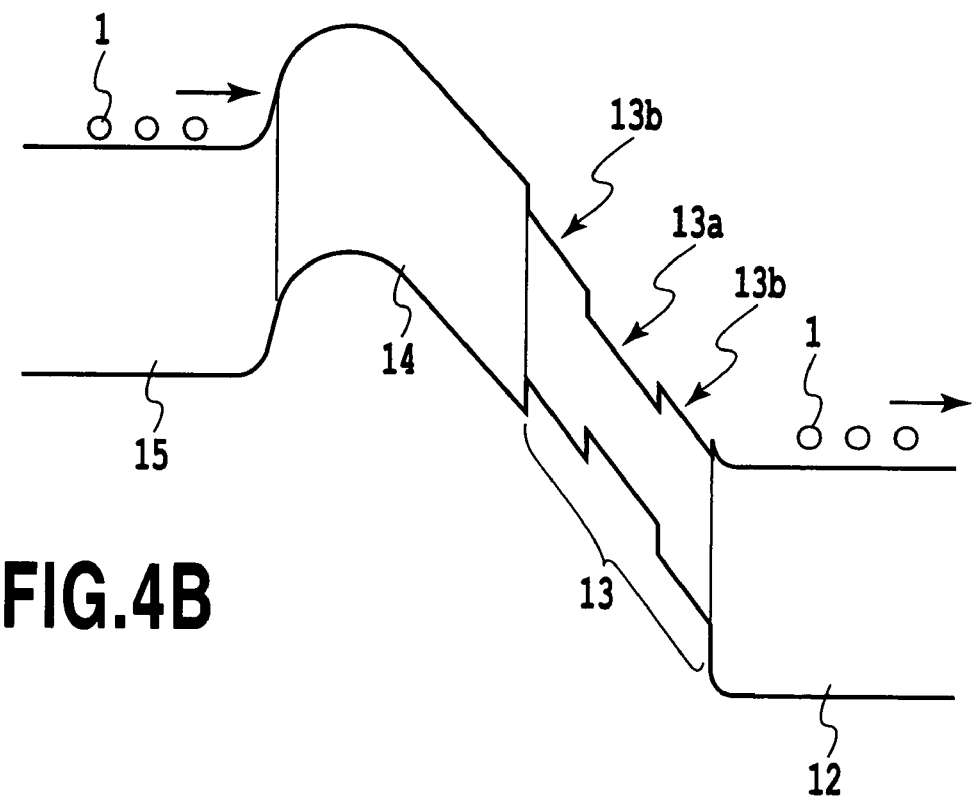
FIG. 4B is a band diagram of the semiconductor optical modulator according to the first embodiment, showing a state in which an electric field is applied.

FIG. 4A and FIG. 4B each show a band diagram of an InP-based multi-quantum well semiconductor optical modulator according to the first embodiment. FIG. 4A is a band diagram in a state in which voltage is not applied, and FIG. 4B is a band diagram in a state in which voltage is applied. FIG. 4A and FIG. 4B each show a banded structure corresponding to a structure in which, from the right in the figures, the n-InP cladding layer 12, the optical waveguide core layer 13, the SI-InP cladding layer 14, and the n-InP cladding layer 15 are sequentially laminated on the SI-InP substrate. FIG. 4A and FIG. 4B each show a banded structure in a case in which the optical waveguide core layer 13 is made up of a non-doped multi-quantum well layer (MQW) 13a having a band-gap wavelength of 1370 nm and non-doped InGaAsP light-confining layers 13b having a band-gap wavelength of 1300 nm that are disposed on and under the layer 13a, respectively.

In the banded structure of the SI-InP cladding layer 14, a doped Fe atom serves as an acceptor that has been ionized at a deep level, and, as a result, the band is bent by the electric charge of the ionized acceptor, so that a potential barrier against electrons 1 is formed. The potential barrier prevents a leakage current of the electrons 1, thereby making it possible to efficiently apply an electric field to the optical waveguide core layer 13 when voltage is applied.

Without being limited to the aforementioned form, the semiconductor optical modulator according to the first embodiment of the present invention may be structured so that only an SI-InP cladding layer is placed between the optical waveguide core layer 13 and the electrode 16. Additionally, the semiconductor optical modulator according to the first embodiment of the present invention may be structured so that an n-InP cladding layer is placed between the optical waveguide core layer 13 and the electrode 16, and an SI-InP cladding layer may be used instead of the n-InP cladding layer 12. Still additionally, the semiconductor optical modulator according to the first embodiment of the present invention may be structured so that an n-InP cladding layer is placed between the optical waveguide core layer 13 and the electrode 16, and a layered structure formed by an SI-InP cladding layer and an n-InP cladding layer (in which the SI-InP cladding layer is placed directly under the optical waveguide core layer 13) may be used instead of the n-InP cladding layer 12.

Although the first embodiment has been described as above based on the semiconductor optical modulator that has the high-mesa waveguide structure of FIG. 1, the same effect can be obtained even in the semiconductor optical modulator that has the ridge waveguide structure of FIG. 2.

Second Embodiment

Figure 5:
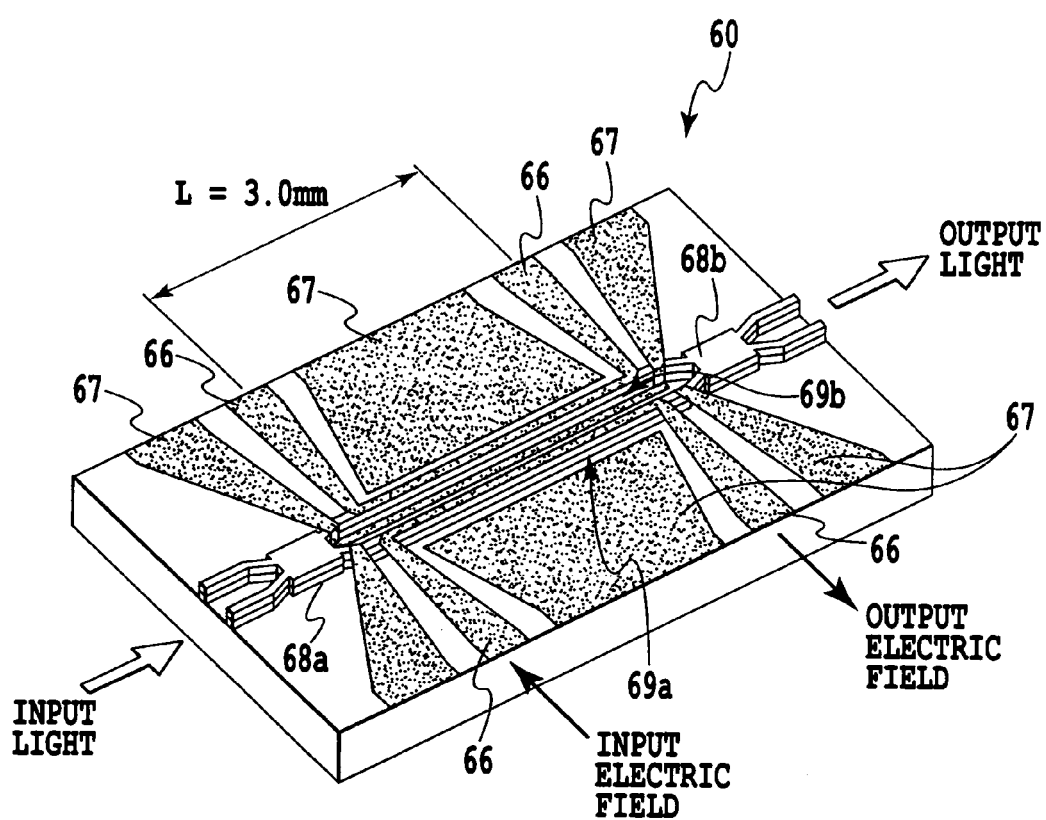
FIG. 5 is a schematic external view of a Mach-Zehnder type optical modulator according to a second embodiment.

FIG. 5 shows a schematic external appearance of a Mach-Zehnder type optical modulator according to a second embodiment. As shown in FIG. 5, the Mach-Zehnder type optical modulator 60 includes a 2×2 multi-mode interference (MMI) type coupler 68a that is used to divide input light into two light beams, two phase modulating waveguides 69a and 69b that modulate the phase of each of the divided light beams based on an applied voltage, a 2×2 multi-mode interference type coupler 68b that combines modulated light beams together, a signal electrode 66 used to apply an electric field to the phase modulating waveguides 69a and 69b, and a ground electrode 67, which are formed on a substrate. Herein, the length (phase modulation region) L of each of the phase modulating waveguides 69a and 69b is 3 mm.

Figure 6:
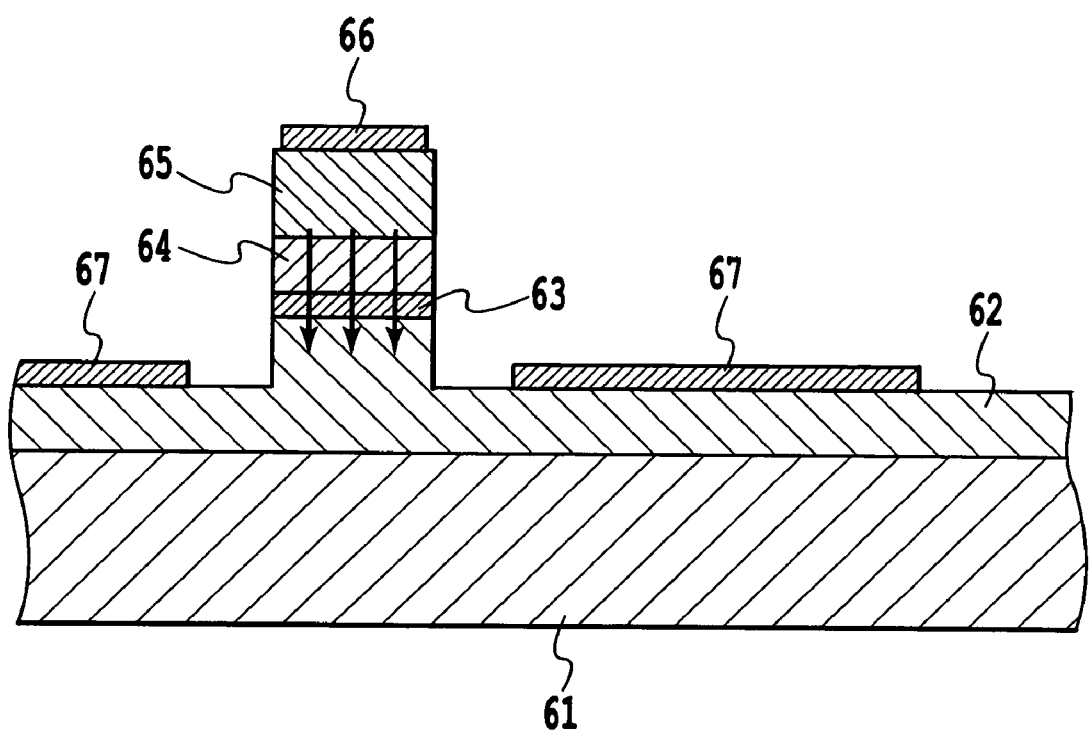
FIG. 6 is a schematic sectional view of a phase modulation optical waveguide part of the Mach-Zehnder type optical modulator according to the second embodiment.

FIG. 6 shows a cross-section of a phase modulating waveguide of the Mach-Zehnder type optical modulator according to the second embodiment. As shown in FIG. 6, the Mach-Zehnder type optical modulator according to the second embodiment includes an n-InP cladding layer 62, an optical waveguide core layer 63 that consists of an MQW and InGaAsP light-confining layers disposed on the upper and lower surfaces thereof, an SI-InP cladding layer 64, an n-InP cladding layer 65, a signal electrode 66 disposed at the waveguide mesa top part, and ground electrodes 67 disposed at the mesa bottom part (that is, on the surface of the n-InP cladding layer 62), which are sequentially laminated on an SI-InP substrate 61.

The absorption wavelength of the MQW is 1370 nm, which is sufficiently away from 1550 nm of signal light. The mesa width of the waveguide is 2.0 μm, the mesa height thereof is 3.0 μm, and the thickness of the SI-InP cladding layer 64 is 1.0 μm.

Figure 7A:
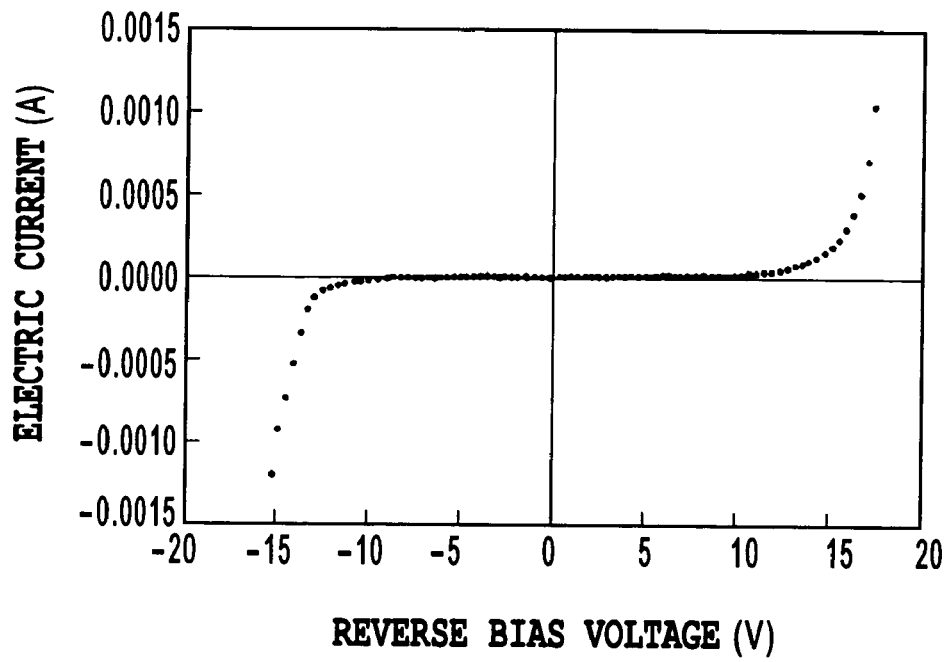
FIG. 7A is a graph showing voltage-current characteristics of a phase modulating waveguide of the Mach-Zehnder type optical modulator according to the second embodiment.
Figure 7B:
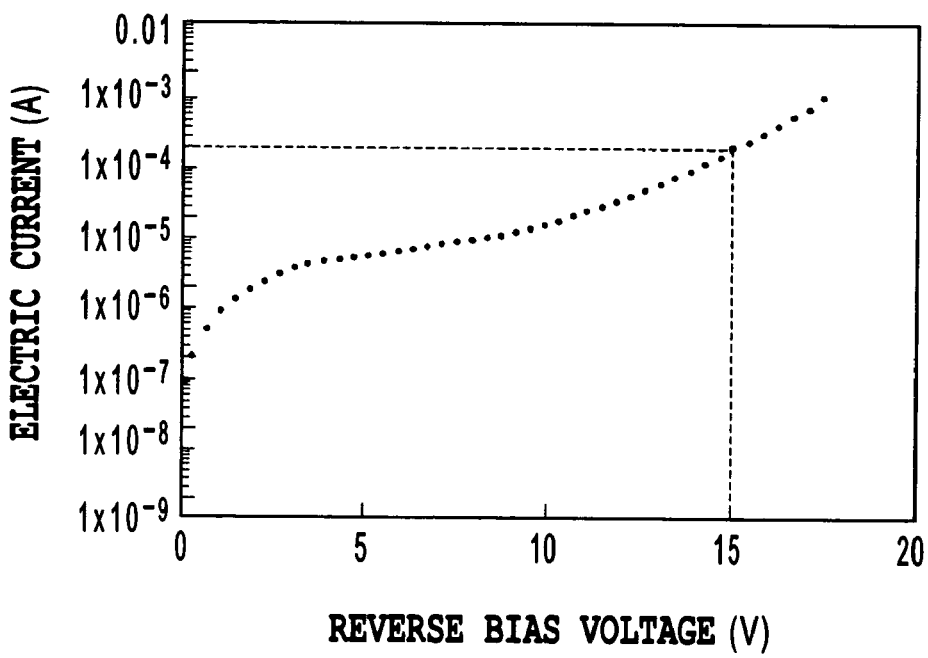
FIG. 7B is a graph showing voltage-current characteristics of the phase modulating waveguide of the Mach-Zehnder type optical modulator according to the second embodiment.

FIG. 7A and FIG. 7B each show voltage-current characteristics of the phase modulating waveguide of the Mach-Zehnder type optical modulator according to this embodiment. FIG. 7A shows a relationship between an applied voltage and a leakage current, and FIG. 7B shows a leakage current in regions of FIG. 7A having a voltage of 0V or more, which is shown by a logarithm display. FIG. 7A and FIG. 7B indicate the fact that the phase modulating waveguides 69a and 69b have a withstand voltage of about ±15V in which a leakage current is extremely small and the fact that voltage is effectively applied to the optical waveguide core layer 63 and the SI-InP cladding layer 64.

It is understood that the SI-InP cladding layer 64 with a thickness of 1.0 μm has an excellent potential barrier characteristic in which a leakage current is 200 μA or less. The quantity of Fe doped in the SI-InP cladding layer 64 is made greater than the quantity of Fe doped in the SI-InP cladding layer 14 (see FIG. 1) in the first embodiment, and, as a result, the withstand voltage is improved so as to be approximately doubled.

Therefore, by using the SI-InP cladding layer as a potential barrier, it is possible to form a good quality barrier which is much more easily produced and which has more excellent withstand voltage than the barrier of a p-type semiconductor according to the BRAQWET structure. In other words, although the BRAQWET structure has a withstand voltage of about ±2V, a withstand voltage of about ±15V can be obtained by using the SI-InP cladding layer as a potential barrier.

The BRAQWET structure is a structure that uses a change in absorption coefficient or a change in the refractive index by injecting electrons into the MQW. On the other hand, the optical modulator according to the first and second embodiments employs a method that uses a Pockels Effect by applying voltage to an optical waveguide core layer. The method according to the first and second embodiments can keep wavelength chirp and wavelength dependence smaller than the method used in the BRAQWET structure. The method according to the first and second embodiments can satisfy characteristics that are widely required of the optical modulator.

Document 5 mentioned above refers to the use of the BRAQWET structure. However, Document 5 does not refer to the MQW structure. The structure of the waveguide according to the first and second embodiments is principally characterized in that a semi-insulating type semiconductor is used as a layer that blocks the flow of an electric current. Additionally, the structure of the waveguide according to the first and second embodiments uses the Pockels Effect by applying voltage without injecting electrons into the optical waveguide core layer. Thus, the present invention provides a waveguide structure that differs entirely from that of the optical modulator of Document 5 in the structure of each device and in the principle of operation.

Figure 8A:
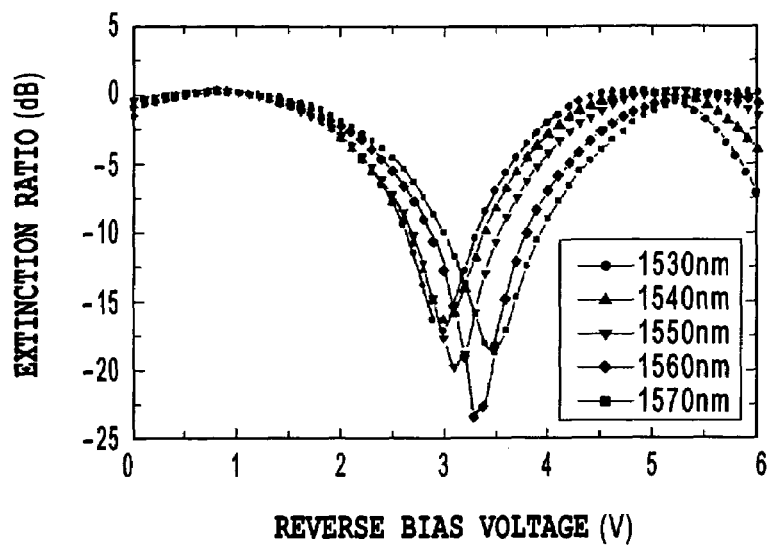
FIG. 8A shows transmitted-light intensity characteristics, which are obtained when voltage is applied, of the Mach-Zehnder type optical modulator according to the second embodiment.
Figure 8B:
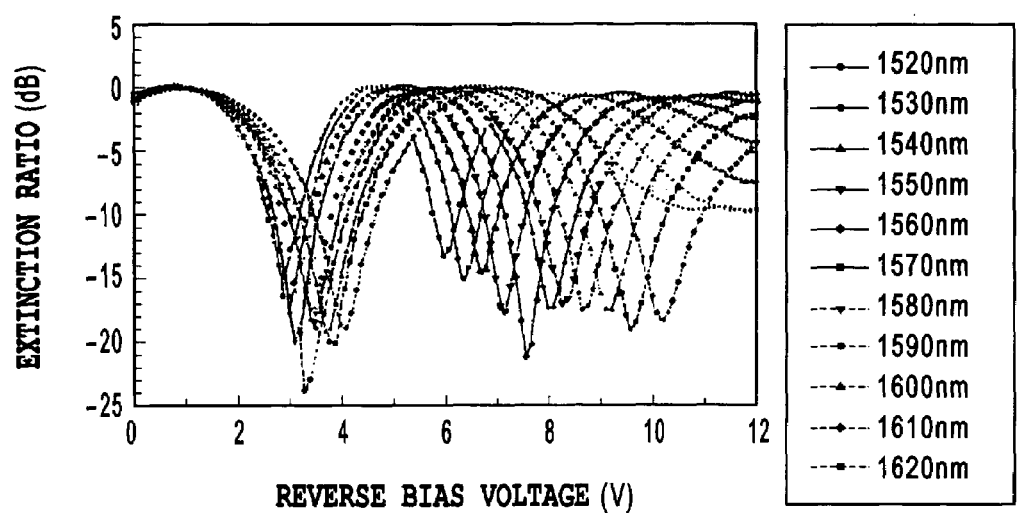
FIG. 8B shows transmitted-light intensity characteristics, which are obtained when voltage is applied, of the Mach-Zehnder type optical modulator according to the second embodiment.

FIG. 8A and FIG. 8B each show a change in transmitted-light intensity, which is obtained when voltage is applied, of the Mach-Zehnder type optical modulator according to the second embodiment. FIG. 8A and FIG. 8B each show a change in transmitted-light intensity in each wavelength by changing the wavelength of input light so as to be 1520 nm to 1620 nm. FIG. 8A is an enlarged view of a region in which a reverse bias voltage is 6V or less in FIG. 8B. As shown in FIG. 8A and FIG. 8B, the Mach-Zehnder type optical modulator according to this embodiment can obtain an extinction ratio of 15 dB or more in a 40-nanometer wavelength band in which the input light wavelength ranges from 1530 nm to 1570 nm, and can operate independently of wavelengths under the same operational condition of a reverse bias voltage of 2.2V.

Additionally, FIG. 8A and FIG. 8B indicate that a deterioration in transmitted-light intensity does not occur when the reverse bias voltage is set at a voltage ($2V\pi$) by which the phase of light is reversed. Herein, "$V\pi$" denotes voltage that is needed to perform an extinction operation in the Mach-Zehnder type optical modulator. This characteristic is obtained from the fact that photoabsorption hardly occurs in the region of the optical waveguide core layer. In a structure, such as the BRAQWET structure, that uses a change in band level, a close relationship exists between the input light wavelength and the band level, and therefore it is impossible to obtain the aforementioned characteristic independent of wavelengths.

The Mach-Zehnder type optical modulator according to the second embodiment can obtain the independent-of-wavelengths characteristic and the non-absorption characteristic from the fact that the absorption edge wavelength of the optical waveguide core layer is set sufficiently away from the input light wavelength and the fact that the structure is formed to use the Pockels Effect.

The length of the phase modulating waveguide of the conventional Schottky electrode type modulator is about 10 mm. Since a region in which an electric field is applied is made small in the second embodiment, a phase modulation can be performed with high efficiency, and signal light can be sufficiently modulated in the phase modulating waveguide having a short length of 3 mm.

Next, a description will be given of high-speed driving characteristics in the Mach-Zehnder type optical modulator according to the second embodiment. In the optical waveguide of the optical modulator according to the present invention, a semiconductor layer being in contact with two electrodes is an n-type semiconductor. Since the optical waveguide of the optical modulator according to the present invention does not use a p-type semiconductor layer, an electric signal loss and a light absorption loss, which result from the p-type semiconductor layer, can be avoided. Additionally, in the optical waveguide of the optical modulator according to the present invention, a velocity condition and an impedance condition can be matched between an electric signal and signal light by controlling the width of the waveguide layer and the thickness of an electric-field-applied region that includes the optical waveguide core layer and the SI-InP cladding layer so as to adjust the capacity component of the optical waveguide. The optical waveguide of the optical modulator according to the present invention can be realized as a high-speed optical modulator that modulates light with a high-speed electric signal by employing a traveling-wave-type electrode structure in which a velocity condition and an impedance condition are matched.

Figure 9A:
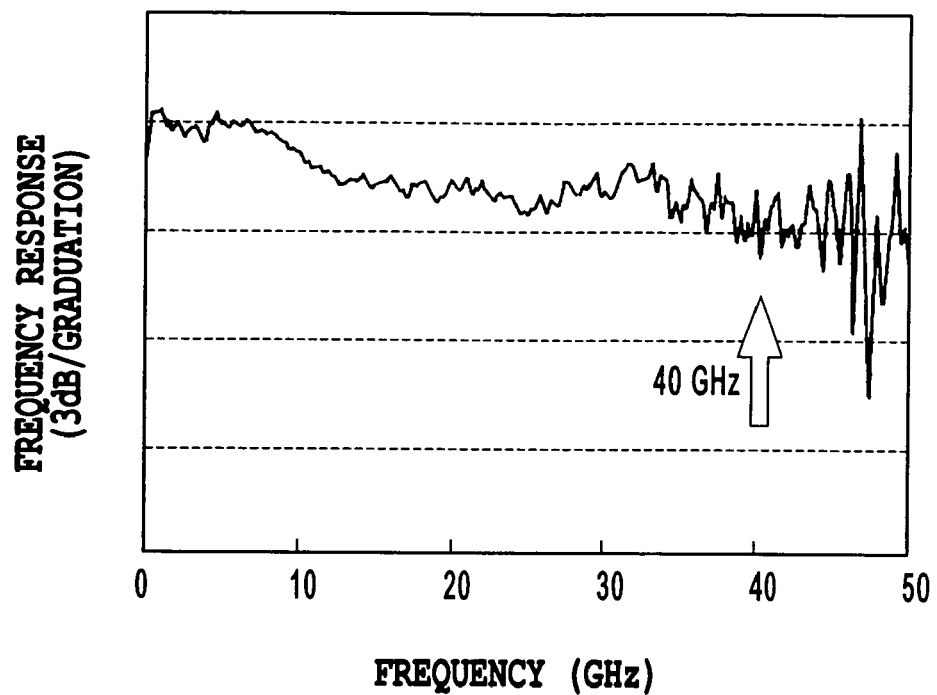
FIG. 9A shows small-signal response characteristics of the Mach-Zehnder type optical modulator according to the second embodiment.
Figure 9B:
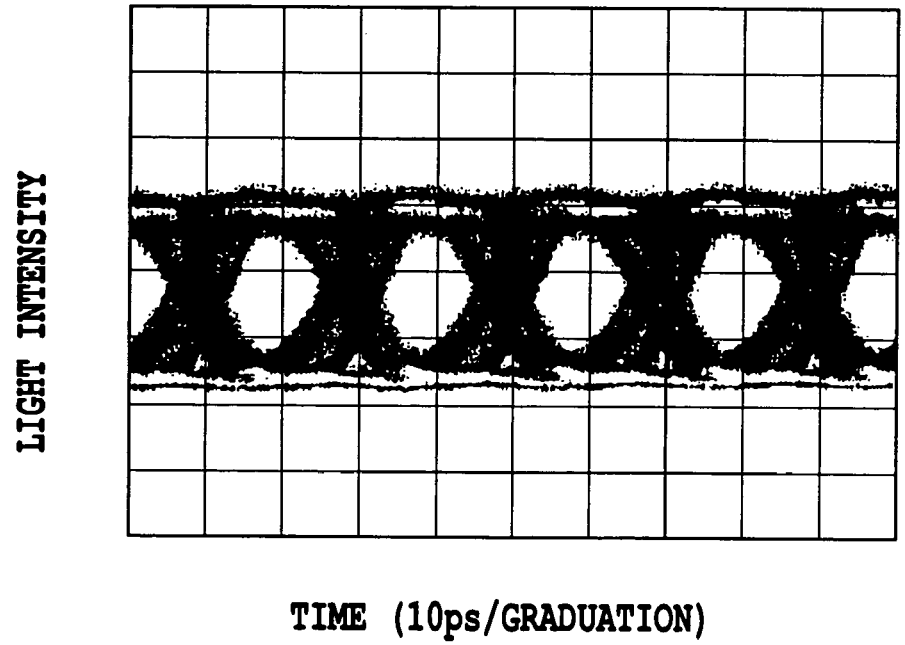
FIG. 9B shows a 40 Gbit/s eye-diagram of the Mach-Zehnder type optical modulator according to the second embodiment.
Figure 9C:
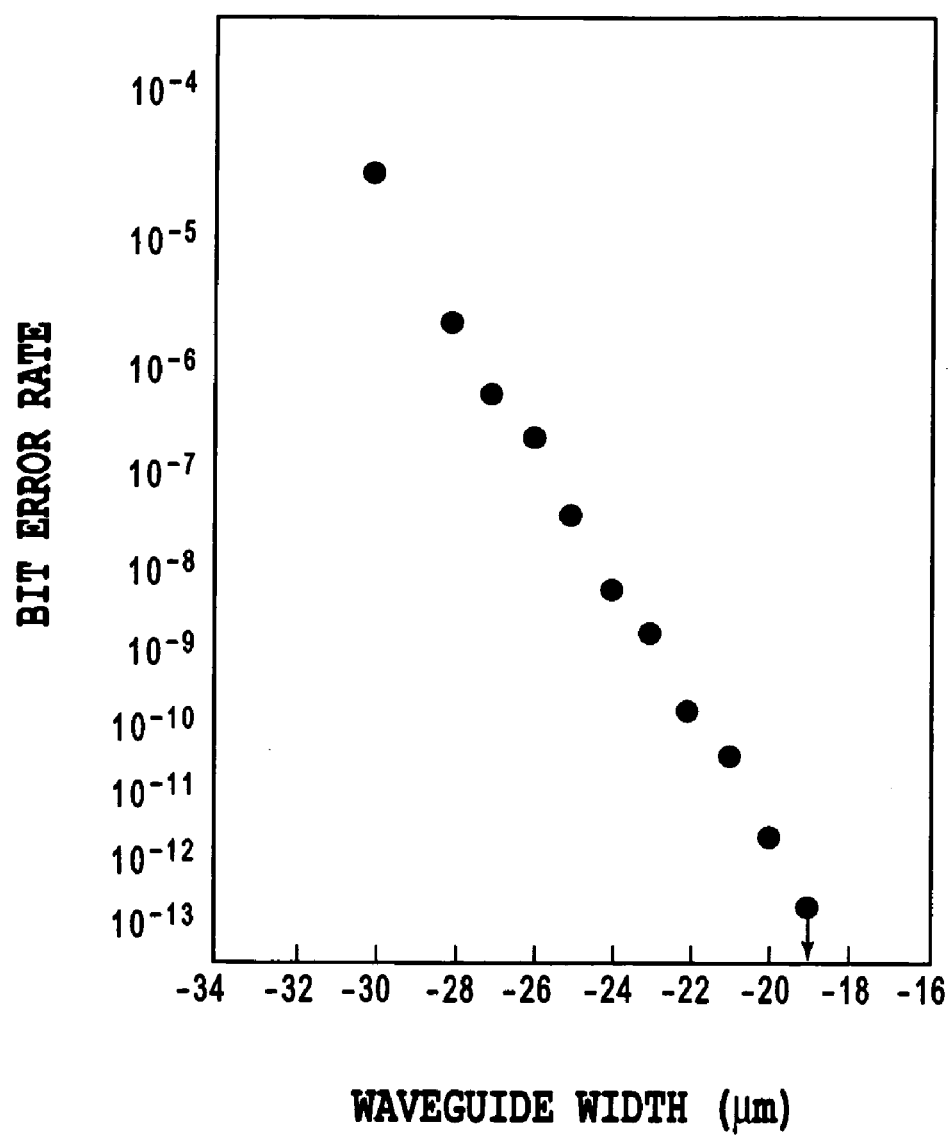
FIG. 9C shows a 40 Gbit/s error-rate of the Mach-Zehnder type optical modulator according to the second embodiment.

FIG. 9A, FIG. 9B, and FIG. 9C are graphs showing high-frequency signal driving characteristics of the Mach-Zehnder type optical modulator according to this embodiment. FIG. 9A shows small-signal frequency characteristics that show response characteristics of a high-frequency electric signal and a light modulating signal. As shown in FIG. 9A, a small-signal frequency band in which the frequency response is downed by 3 dB is 40 GHZ, and a band sufficient for a modulation of 40 Gbit/s is obtained. FIG. 9B shows an eye-diagram in 40 Gbit/s. As shown in FIG. 9B, a clear eye-opening can be ascertained, and a high-speed optical modulation can be performed. FIG. 9C shows a measurement result of a bit error rate obtained when a modulation is performed at 40 Gbit/s. As shown in FIG. 9C, an error-free operation can be realized, and it is understood that the Mach-Zehnder type optical modulator according to this embodiment is useful as a high-speed optical modulator.

Next, a description will be given of a velocity-matching condition in the Mach-Zehnder type optical modulator according to the second embodiment and a tolerance with respect to the mesa width of an impedance-matching condition. Velocity matching and impedance matching are obtained by controlling the capacity component of the optical waveguide of the modulator. Herein, the capacity component of the optical waveguide can be adjusted by controlling the width of a waveguide layer or the thickness of an electric-field-applied region consisting of an optical waveguide core layer and an SI-InP cladding layer. Since the thickness of the electric-field-applied region is the thickness of a semiconductor layer, a precise control operation by a unit of tens of angstroms can be performed by epitaxial growth. On the other hand, since the width of the waveguide layer is controlled by etching the surface of the semiconductor, a processing error by the unit of 0.1 µm occurs.

Figure 10A:
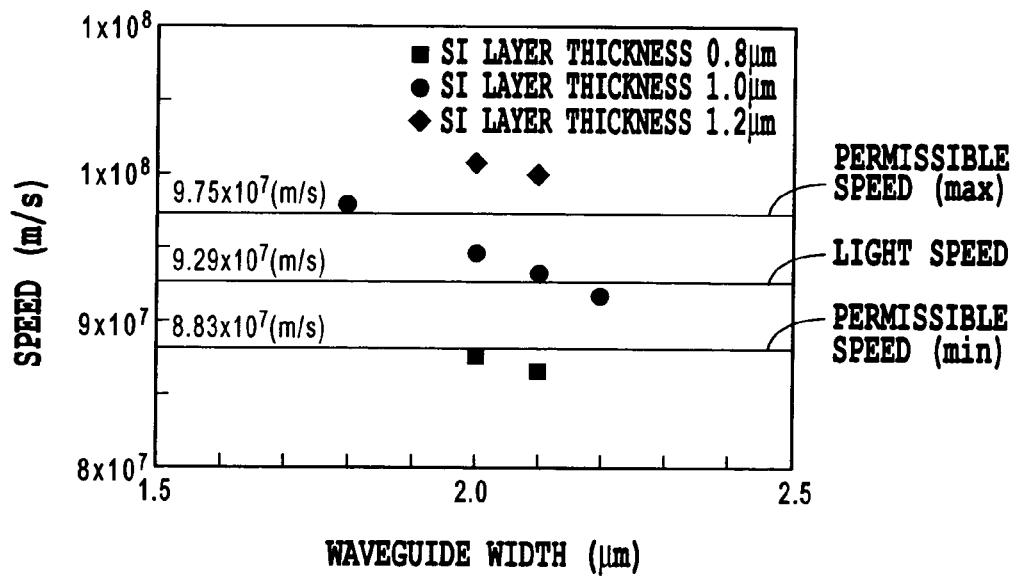
FIG. 10A shows mesa-width dependence of a velocity-matching condition of the Mach-Zehnder type optical modulator having a traveling-wave-type electrode according to the second embodiment.
Figure 10B:
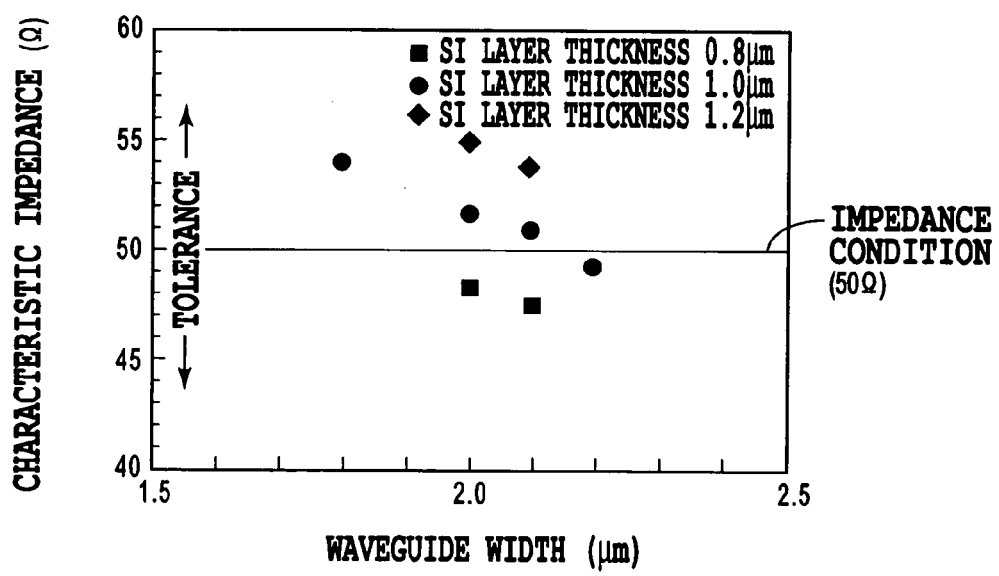
FIG. 10B shows mesa-width dependence of an impedance-matching condition of the Mach-Zehnder type optical modulator having a traveling-wave-type electrode according to the second embodiment.

FIG. 10A is a graph showing a result obtained by calculating a mesa-width tolerance of the velocity-matching condition concerning an optical waveguide in which the thickness of a semi-insulating layer is 0.8 µm, 1.0 µm, or 1.2 µm. FIG. 10B is a graph showing a result obtained by calculating a mesa-width tolerance of the impedance-matching condition concerning an optical waveguide in which the thickness of a semi-insulating layer is 0.8 µm, 1.0 µm, or 1.2 µm.

In more detail, FIG. 10A shows a relationship between the width of an optical waveguide having a semi-insulating layer with a fixed thickness (abscissa axis of the graph) and the speed of an electric signal attained when the electric signal is given to the optical waveguide (ordinate axis of the graph). From FIG. 10A, it is understood that the speed of the electric signal becomes slower in proportion to an increase in the width of the waveguide. Additionally, from FIG. 10A, it is understood that the speed of the electric signal becomes faster in proportion to an increase in the thickness of the semi-insulating layer. As a result, as is understood from FIG. 10A, the optical waveguide in which the thickness of the semi-insulating layer is 1.0 µm satisfies the velocity-matching condition when the width of the waveguide is 2.1 µm. In other words, the speed of the electric signal coincides with the speed ($9.29 \times 10^7$ m/s) of signal light traveling through the waveguide when the width of the waveguide is 2.1 µm.

In consideration of light modulation characteristics in the speed whose upper limit is 40 Gbit/s, a deviation in phase length, which is caused by velocity mismatching between signal light that has passed through a phase modulating region of 3 mm and an electric signal that has passed through the signal electrode 66 of 3 mm, can be permitted up to 150 µm. The permissible deviation in phase length of 150 µm becomes equal to $8.83 \times 10^7$ m/s to $9.75 \times 10^7$ m/s in terms of the permissible speed range of the electric signal.

As a result, the tolerance of the width of the waveguide to satisfy the velocity-matching condition becomes equal to 1.8 µm to 2.4 µm, which is obtained by adding or subtracting 0.3 µm to or from 2.1 µm at which the respective speeds completely coincide with each other (that is, 2.1 µm±0.3 µm). Since this tolerance is wide enough for processing accuracy, an optical modulator having a good yield can be produced even if there are a few processing errors.

FIG. 10B shows a relationship between the width of the optical waveguide having a semi-insulating layer with a fixed thickness (abscissa axis of the graph) and the characteristic impedance of the signal electrode 66 that gives an electric signal to the optical waveguide (ordinate axis of the graph). From FIG. 10B, it is understood that the characteristic impedance becomes lower in proportion to an increase in the width of the waveguide, and that the characteristic impedance becomes higher in proportion to an increase in the thickness of the semi-insulating layer. As a result, as is understood from FIG. 10B, the optical waveguide in which the thickness of the semi-insulating layer is 1.0 µm satisfies the impedance-matching condition when the width of the waveguide is 2.1 µm. In other words, the characteristic impedance of the signal electrode 66 coincides with the impedance 50Ω of a peripheral device connected to the Mach-Zehnder type optical modulator 60 when the width of the waveguide is 2.1 µm.

Considering that a deviation in impedance of about 5Ω does not affect light modulation characteristics when devices are connected together, the tolerance of the characteristic impedance of the signal electrode 66 can be set at 45Ω to 55Ω. As a result, the tolerance of the width of the waveguide to satisfy the impedance-matching condition becomes equal to 1.75 µm to 2.45 µm, which is obtained by adding or subtracting about 0.35 µm to or from 2.1 µm at which the respective impedances completely coincide with each other (that is, 2.1 µm±0.35 µm). Since this tolerance is likewise wide enough for processing accuracy, an influence exerted by processing errors is small, and an optical modulator that can perform a high-speed modulation can be easily produced.

The conventional semiconductor Mach-Zehnder type optical modulator has a great optical loss in the p-type semiconductor part of the lumped-constant type optical modulator, and has difficulty in operating at 10 Gbit/s or more, because of speed restrictions by the CR time constant. Additionally, in the conventional semiconductor Mach-Zehnder type optical modulator, the traveling-wave-electrode-type optical modulator is small in the modulation efficiency of the refractive index, and the phase-modulating portion cannot be easily reduced in size, so that the operating voltage is high.

As described above, the semiconductor Mach-Zehnder type optical modulator and the phase modulator according to the second embodiment have a layered structure in which an optical waveguide core layer and an SI cladding layer are sandwiched between two n-type doped cladding layers, without using p-type doped layers. Therefore, it is possible to realize an optical waveguide or a traveling-wave-type electrode structure that has neither photoabsorption losses of a p-type semiconductor nor conductor losses of a p-type electrode and that has overcome the problem resulting from the p-type doped layer.

Additionally, in comparison with the conventional semiconductor Mach-Zehnder type optical modulator having the traveling-wave-type electrode structure, the semiconductor Mach-Zehnder type optical modulator and the phase modulator according to the second embodiment allows for setting the distance between electrode layers at 5 µm or less. Accordingly, the electric field strength can be enlarged. Therefore, in the semiconductor Mach-Zehnder type optical modulator and the phase modulator according to the second embodiment, the modulation efficiency of the refractive index becomes higher, and the phase-modulating portion can be reduced in size, and the operating voltage can be lowered.

Additionally, the semiconductor Mach-Zehnder type optical modulator and the phase modulator according to the second embodiment can operate even in a high frequency band of 10 Gbit/s or more with high modulation efficiency without being restricted by the CR time constant by employing a traveling-wave-type electrode structure, and therefore devices can be reduced in size, and voltage can be lowered.

Third Embodiment

Figure 11:
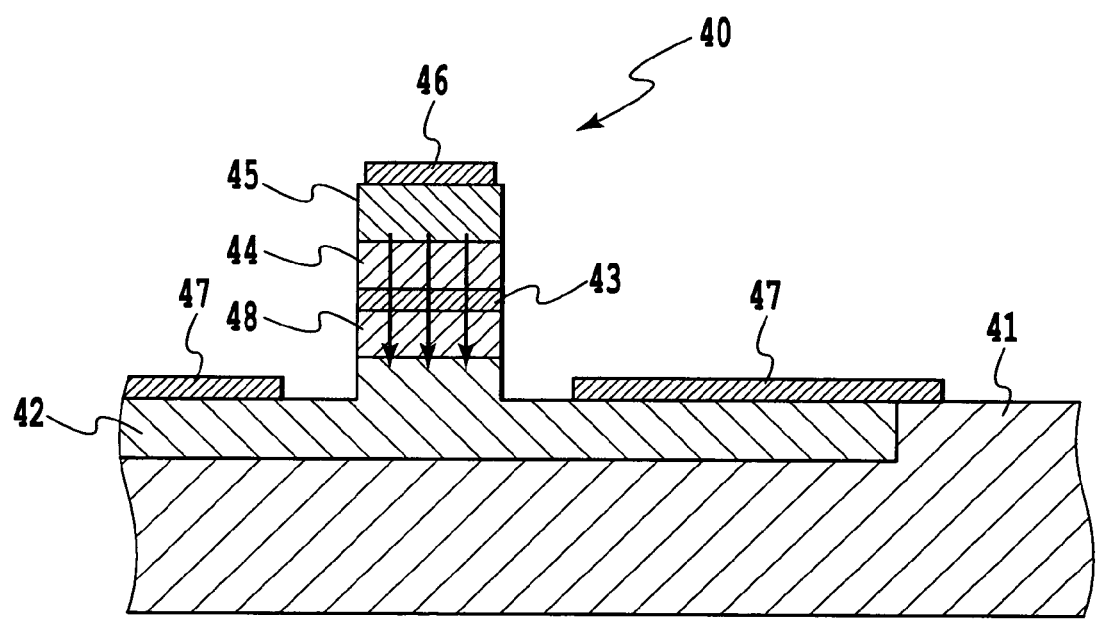
FIG. 11 is a schematic sectional view of a waveguide (high-mesa structure), to which an electric field is applied, of a semiconductor optical modulator according to a third embodiment.

FIG. 11 is a schematic sectional view of a waveguide of an InP-based multi-quantum well semiconductor optical modulator according to a third embodiment. FIG. 11 shows a cross-sectional structure of an electric-field-applied portion of the waveguide.

The semiconductor optical modulator according to the third embodiment has an optical waveguide structure obtained by processing a layered structure, in which an n-InP cladding layer 42, an SI-InP cladding layer 48, an optical waveguide core layer 43, an SI-InP cladding layer 44, and an n-InP cladding layer 45 are sequentially laminated on an SI-InP substrate 41, so as to be shaped like a mesa according to an etching process.

The semiconductor optical modulator according to the third embodiment differs from the modulator according to the first embodiment in the fact that the layered structure is formed such that the SI-InP cladding layer 48 is placed between the optical waveguide core layer 43 and the n-InP cladding layer 42, and the optical waveguide core layer 43 is sandwiched between the SI-InP cladding layers 48 and 44.

The semiconductor optical modulator according to the third embodiment is a high-mesa waveguide structure 40 in which the etching process is performed up to a part (that is, the n-InP cladding layer 42 in this embodiment) under the optical waveguide core layer 43.

The semiconductor optical modulator according to the third embodiment has an electrode 46 placed on the upper surface of the n-InP cladding layer 45 and ground electrodes 47 on the upper surface of the n-InP cladding layer 42.

In order to apply a high frequency signal between the electrodes, the electrode structure is a coplanar waveguide line (CPW) structure formed such that the electrode 46 is placed between the two ground electrodes 47.

Figure 12:
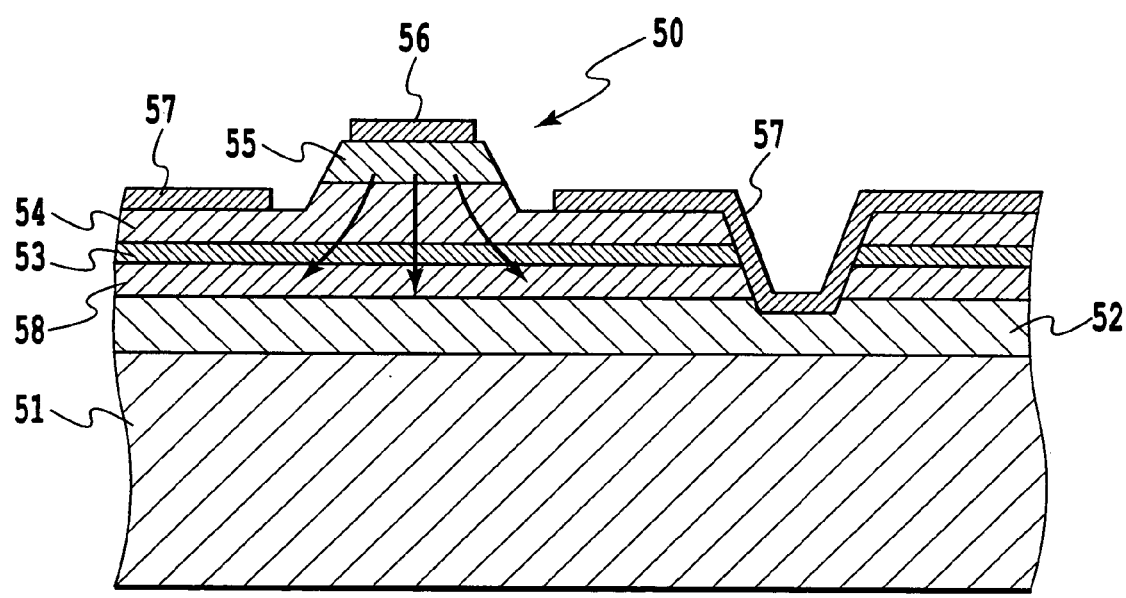
FIG. 12 is a schematic sectional view of a waveguide (ridge structure), to which an electric field is applied, of the semiconductor optical modulator according to the third embodiment.

The waveguide structure can employ a ridge waveguide structure in which an etching operation has been stopped at a part above the optical waveguide core layer. FIG. 12 shows a cross-sectional structure of an electric-field-applied portion of the semiconductor optical modulator according to the third embodiment, to which a ridge waveguide structure 50 is applied. The semiconductor optical modulator according to the third embodiment, to which the ridge waveguide structure 50 is applied, has a layered structure in which an n-InP cladding layer 52, an SI-InP cladding layer 58, an optical waveguide core layer 53, an SI-InP cladding layer 54, and an n-InP cladding layer 55 are sequentially laminated on an SI-InP substrate 51, and an etching operation is performed up to the SI-InP cladding layer 54 that is a layer directly above the optical waveguide core layer 53.

The semiconductor optical modulator shown in FIG. 12 has an electrode 56 placed on the upper surface of the n-InP cladding layer 55. A ground electrode is required to be connected to the n-InP cladding layer placed under the optical waveguide core layer. The semiconductor optical modulator shown in FIG. 12 has a groove extending from the surface of the SI-InP cladding layer 54 to the n-InP cladding layer 52, and a ground electrode 57 is disposed so as to be connected to the n-InP cladding layer 52.

The same description as in the first embodiment applies to the problem of bringing about contact between the ground electrode 57 and the optical waveguide core layer 53 when the ground electrode 57 and the n-InP cladding layer 52 are connected together.

The optical waveguide core layer 43 is caused to generate a signal electric field (shown by arrows in FIG. 11) by applying voltage between the electrode 46 and the ground electrode 47 during an operation. In the semiconductor optical modulator according to the third embodiment, the n-InP cladding layer 45 and the n-InP cladding layer 42 are electrically conductive and are capable of fulfilling the same function as the electrode. Therefore, a substantial electrode-to-electrode distance can be made short, and a highly efficient electrooptic effect can be obtained.

In the semiconductor optical modulator according to the third embodiment, the substantial electrode-to-electrode distance (that is, distance between the n-InP cladding layer 45 and the n-InP cladding layer 42) is short. Therefore, a high-intensity electric field can be generated even when a relatively low voltage is applied, and the driving voltage can be lowered, and the device can be reduced in size.

However, the semiconductor optical modulator according to the third embodiment has a substantial electrode-to-electrode distance greater by the distance of the SI-InP cladding layer 48 than the semiconductor optical modulator according to the first embodiment. Therefore, for example, from the point of view of the efficiency of an electrooptic effect, the semiconductor optical modulator of the first embodiment is superior to the semiconductor optical modulator of the third embodiment. However, the semiconductor optical modulator of the third embodiment has the SI-InP cladding layers 44 and 48, and has a layered structure in which the optical waveguide core layer 43 is sandwiched between the SI-InP cladding layers 44 and 48. Therefore, the semiconductor optical modulator according to the third embodiment has the superb functionality of high convenience since the direction in which voltage is applied is not limited to one direction.

The distance from the waveguide layer 43 to the electrode 46 in the semiconductor optical modulator of the third embodiment is the same as that of the semiconductor optical modulator of the first embodiment, and it is preferable to set the distance at 1 μm or more. In the semiconductor optical modulator of the third embodiment, the distance from the optical waveguide core layer 43 to the electrode 46 can be kept at 1 μm or more by adjusting (enlarging) the thickness of the n-InP cladding layer 45 even if the thickness of the SI-InP cladding layer 44 is made small in order to enhance the efficiency of the electrooptic effect. Therefore, the semiconductor optical modulator of the third embodiment can have a phase-modulating portion that can use a highly efficient electrooptic effect while preventing optical losses caused by the electrode 46.

The semiconductor optical modulator of the third embodiment may be formed such that only an SI-InP cladding layer is placed between the optical waveguide core layer 43 and the electrode 46, or, alternatively, such that the part of the n-InP cladding layer 42 is replaced by an SI-InP cladding layer, and only the SI-InP cladding layer is placed between the optical waveguide core layer 43 and the SI-InP substrate 41.

Although the third embodiment has been described as above based on the semiconductor optical modulator that has the high-mesa waveguide structure of FIG. 11, even a semiconductor optical modulator that has the ridge waveguide structure of FIG. 12 can obtain the same effect.

INDUSTRIAL APPLICABILITY

Since the semiconductor optical modulator according to the present invention does not use a p-type doped layer, photoabsorption losses of a p-type semiconductor and conductor losses of an electric signal do not occur, and it is possible to realize a low-loss optical waveguide and a low-loss traveling-wave-type electrode structure. Additionally, since an SI cladding layer is placed on at least one surface of an optical waveguide core layer, voltage can be applied while preventing electrons from flowing into the optical waveguide core layer.

Since the semiconductor optical modulator according to the present invention can be set a distance between electrode layers at 5 μm or less, the electric-field strength in an optical waveguide core layer can be made greater than a conventional semiconductor optical modulator having a traveling-wave-type electrode structure. Therefore, the modulation efficiency of the refractive index is high, so that a phase-modulating portion can be reduced in size, and an operating voltage can be lowered.

Additionally, since the traveling-wave-type electrode structure is employed, the modulator can operate in a high frequency band of 10 Gbit/s or more with high modulation efficiency unlike a lumped constant electrode that is restricted by a CR time constant, and therefore the device can be reduced in size, and voltage can be lowered.

What is claimed is:

1. A semiconductor Mach-Zehnder type optical modulator comprising:
   a semiconductor optical modulator comprising:
   a layered structure in which a semi-insulating type cladding layer, a semiconductor optical waveguide core layer, and a semi-insulating type cladding layer are sequentially laminated on a substrate, wherein a part of at least one of the semi-insulating type cladding layers including a surface opposite from a laminated surface with the semiconductor optical waveguide core layer is an n-type cladding layer, or all of at least one of the semi-insulating type cladding layers is an n-type cladding layer;

an optical splitter by which input light is split into two light beams; and an optical coupler by which light beams modulated by the semiconductor optical modulator are combined together.

2. The semiconductor Mach-Zehnder type optical modulator according to claim 1, wherein the semiconductor optical modulator has a waveguide structure that is a high-mesa waveguide structure or a ridge waveguide structure.

3. The semiconductor Mach-Zehnder type optical modulator according to claim 1, further comprising electrodes that are respectively connected to the n-type cladding layer or the semi-insulating type cladding layer placed directly on the substrate and to the n-type cladding layer or the semi-insulating type cladding layer including a surface opposite from a laminated surface with the semiconductor optical waveguide core layer laminated on the substrate, and voltage is applied.

4. The semiconductor Mach-Zehnder type optical modulator according to claim 3, wherein the electrodes are configured to be a coplanar waveguide line structure.

5. A semiconductor optical modulator comprising:
a substrate;
a first n-type cladding layer laminated on said substrate;
a first semi-insulating cladding layer laminated on said first n-type cladding layer;
a semiconductor optical waveguide core layer laminated on the first semi-insulating type cladding layer;
a second semi-insulating cladding layer laminated on said semiconductor optical waveguide core layer; and
a second n-type cladding layer laminated on said second semi-insulating cladding layer.

6. The semiconductor optical modulator recited in claim 5, wherein the semiconductor optical modulator comprises a waveguide structure that is a high-mesa waveguide structure or a ridge waveguide structure.

7. The semiconductor optical modulator recited in claim 5, further comprising:
a first electrode connected to said first n-type cladding layer; and
a second electrode connected to said second n-type cladding layer.

8. A semiconductor Mach-Zehnder type optical modulator comprising:
a semiconductor optical modulator comprising:
a substrate;
a first semi-insulating cladding layer laminated on said substrate;
a semiconductor optical waveguide core layer laminated on the first semi-insulating type cladding layer; and
a second semi-insulating cladding layer laminated on the said semiconductor optical waveguide core at least a portion of the first or second semi-insulating cladding layers comprising an n-type cladding structure layer;

an optical splitter by which input light is split into two light beams; and an optical coupler by which light beams modulated by the semiconductor optical modulator are combined together.

9. The semiconductor optical modulator recited in claim 7, wherein the electrodes are configured to be a coplanar waveguide line structure.

10. A semiconductor optical modulator comprising:
a substrate;
a first n-type cladding layer laminated on said substrate;
a semiconductor optical waveguide core layer disposed on a side of said first n-type cladding layer opposite from said substrate;
a second n-type cladding layer disposed on a side of said semiconductor optical waveguide core layer opposite from said substrate; and
a semi-insulating type cladding layer disposed at least one of between said first n-type cladding layer and said optical waveguide core layer and between said second n-type cladding layer and said optical waveguide core layer.

11. The semiconductor optical modulator recited in claim 10, wherein the modulator has a waveguide structure that is a high-mesa waveguide structure or a ridge waveguide structure.

12. The semiconductor optical modulator recited in claim 10, further comprising:
a first electrode connected to said first n-type cladding layer; and
a second electrode connected to said second n-type cladding layer.

13. The semiconductor optical modulator recited in claim 12, wherein the electrodes are configured to be a coplanar waveguide line structure.

14. A semiconductor Mach-Zehnder type optical modulator comprising:
a semiconductor optical modulator comprising
a substrate;
a first n-type cladding layer formed on said substrate;
an optical waveguide core layer formed over said first n-type cladding layer;
a second n-type cladding layer formed over said optical waveguide core layer; and
a semi-insulating type cladding layer disposed at least one of between said first n-type cladding layer and said optical waveguide core layer and between said second n-type cladding layer and said optical waveguide core layer;

an optical splitter by which input light is split into two light beams; and an optical coupler by which light beams modulated by the semiconductor optical modulator are combined together.

* * * * *